US009152005B2

(12) United States Patent
Morikawa et al.

(10) Patent No.: US 9,152,005 B2
(45) Date of Patent: Oct. 6, 2015

(54) PARTICLE DISPERSION FOR DISPLAY, DISPLAY MEDIUM, AND DISPLAY DEVICE

(71) Applicant: FUJI XEROX CO., LTD., Tokyo (JP)

(72) Inventors: Takashi Morikawa, Kanagawa (JP); Naoki Hiji, Kanagawa (JP); Yasuo Yamamoto, Kanagawa (JP); Daisuke Nakayama, Kanagawa (JP); Mieko Seki, Kanagawa (JP); Hiroaki Moriyama, Kanagawa (JP); Ryota Mizutani, Kanagawa (JP); Masaaki Abe, Kanagawa (JP); Nami Tokunaga, Kanagawa (JP); Chikara Manabe, Kanagawa (JP); Jun Cao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 82 days.

(21) Appl. No.: 13/871,609

(22) Filed: Apr. 26, 2013

(65) Prior Publication Data

US 2014/0104675 A1    Apr. 17, 2014

(30) Foreign Application Priority Data

Oct. 12, 2012   (JP) .................................. 2012-227007

(51) Int. Cl.
    *G02B 26/00*    (2006.01)
    *G02B 26/08*    (2006.01)
    *G02F 1/29*     (2006.01)
    *G02F 1/167*    (2006.01)

(52) U.S. Cl.
    CPC ........ *G02F 1/167* (2013.01); *G02F 2001/1678* (2013.01)

(58) Field of Classification Search
    USPC ......... 359/237, 242, 245–247, 290–292, 295, 359/296, 298
    See application file for complete search history.

(56) References Cited

U.S. PATENT DOCUMENTS

| 6,741,387 | B2 * | 5/2004 | Shigehiro et al. ............. 359/296 |
| 6,956,690 | B2 * | 10/2005 | Yu et al. ......................... 359/296 |
| 2007/0126694 | A1 * | 6/2007 | Moriyama et al. ............. 345/107 |
| 2010/0020384 | A1 * | 1/2010 | Machida et al. ............... 359/296 |
| 2010/0134407 | A1 * | 6/2010 | Wang et al. .................... 345/107 |
| 2010/0225997 | A1 * | 9/2010 | Yamamoto et al. ............ 359/296 |
| 2011/0317249 | A1 |  12/2011 | Komatsu |

FOREIGN PATENT DOCUMENTS

| JP | A-7-325434 | 12/1995 |
| JP | B2-2630501 | 7/1997 |
| JP | A-2002-282678 | 10/2002 |
| JP | A-2002-282679 | 10/2002 |
| JP | A-2005-522313 | 7/2005 |

(Continued)

*Primary Examiner* — Joseph P Martinez
*Assistant Examiner* — Brandi Thomas
(74) *Attorney, Agent, or Firm* — Oliff PLC

(57) ABSTRACT

A particle dispersion for display includes color particles for display that move in response to an electric field and include first color particles and second color particles; and a dispersion medium that disperses the color particles for display, in which the second color particles have a larger particle diameter than a particle diameter of the first color particles and the same charging characteristic as a charging characteristic of the first color particles, and in the color particles for display, a ratio (Cs/Cl) of a charge amount Cs of the first color particles per unit area of display to a charge amount Cl of the second color particles per unit area of display is less than or equal to 5.

18 Claims, 4 Drawing Sheets

(56) References Cited

FOREIGN PATENT DOCUMENTS

| JP | A-2009-531532 | 9/2009 |
| JP | A-2009-244635 | 10/2009 |
| JP | A-2011-158783 | 8/2011 |
| JP | A-2012-13784 | 1/2012 |
| WO | WO 00/62913 A1 | 10/2000 |

* cited by examiner

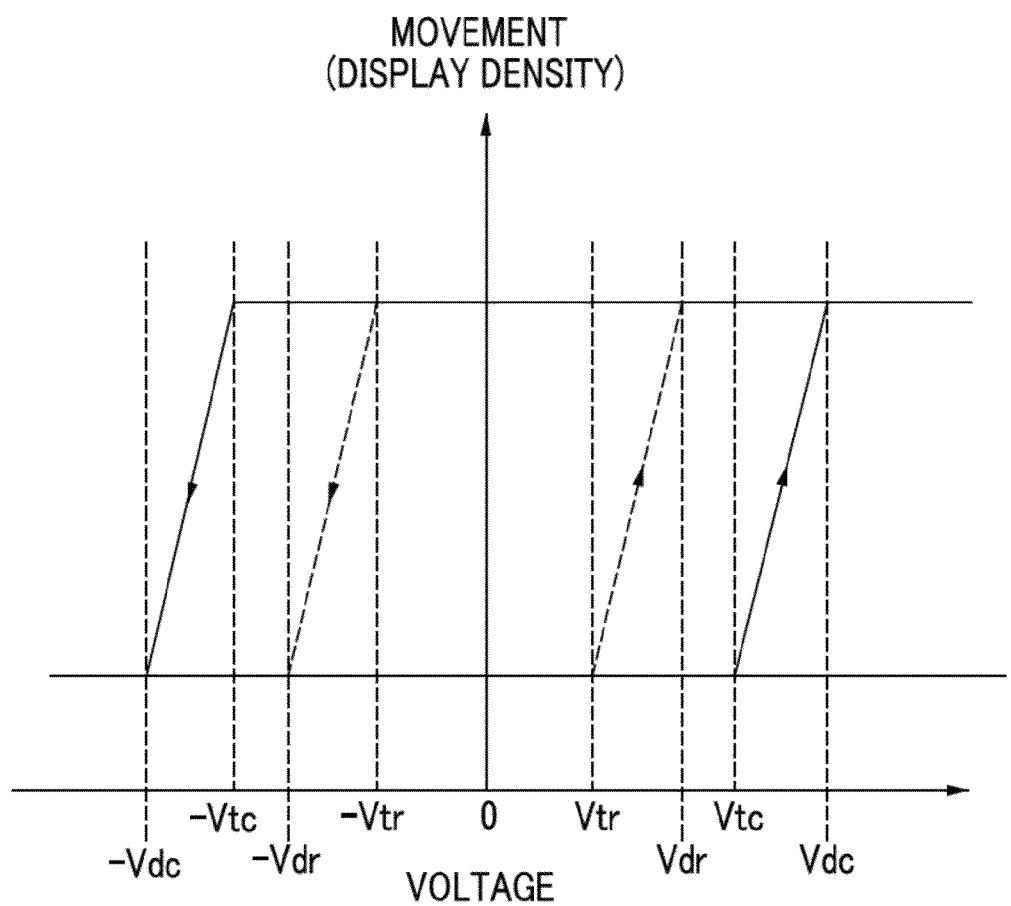

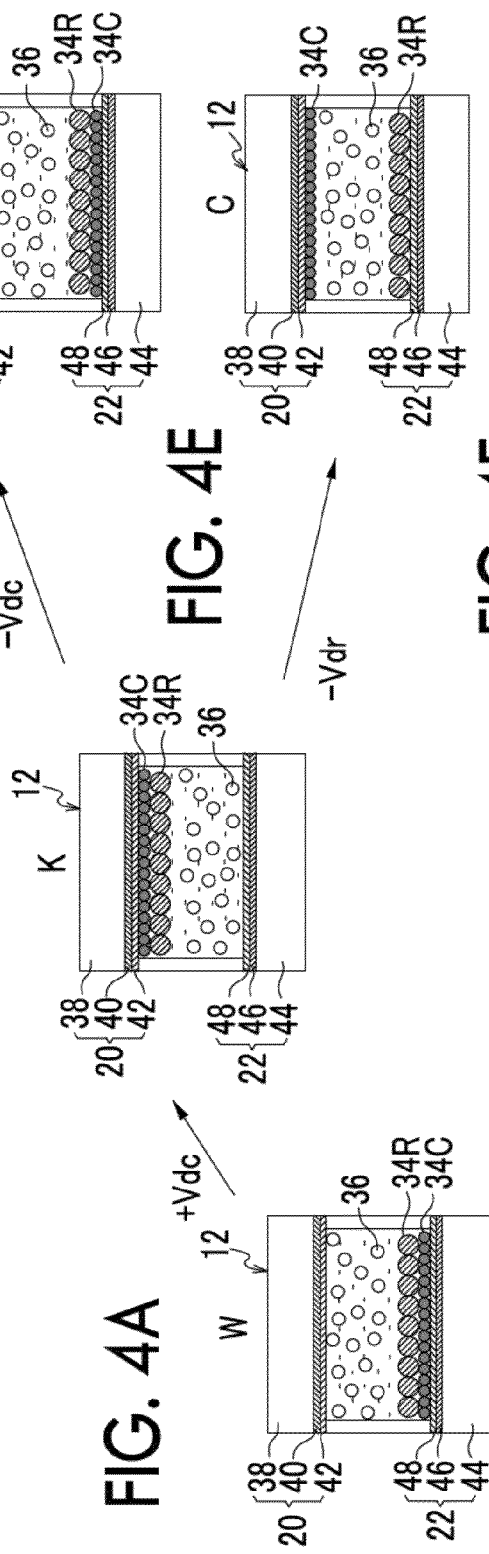
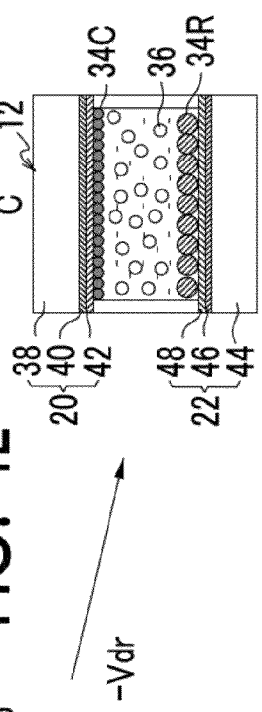
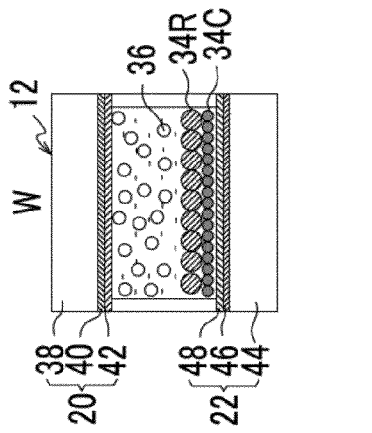
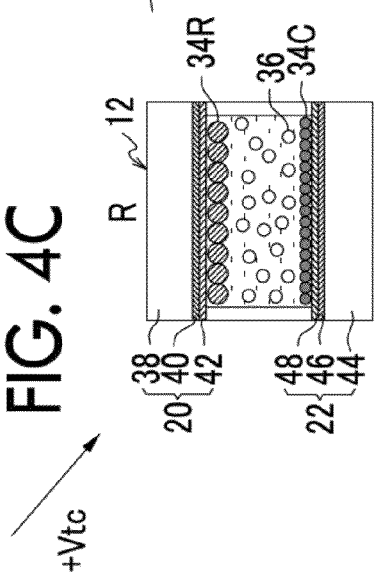
FIG. 4A   FIG. 4B   FIG. 4C   FIG. 4D   FIG. 4E   FIG. 4F

PARTICLE DISPERSION FOR DISPLAY, DISPLAY MEDIUM, AND DISPLAY DEVICE

CROSS-REFERENCE TO RELATED APPLICATIONS

This application is based on and claims priority under 35 USC 119 from Japanese Patent Application No. 2012-227007 filed Oct. 12, 2012.

BACKGROUND

1. Technical Field

The present invention relates to a particle dispersion for display, a display medium, and a display device.

2. Related Art

In the related art, an electrophoretic display technique is proposed as a display medium for realizing repetitive rewriting. In such a display technique, by applying an electric field to charged particles for display (electrophoretic particles) in a liquid, the particles for display alternately move between a viewing surface and a back surface in a cell (for example, a structure in which two electrode substrates overlap each other; and particles for display and a dispersion medium are sealed between the electrode substrates), thereby performing display.

SUMMARY

According to an aspect of the invention there is provided a particle dispersion for display including color particles for display that move in response to an electric field and include first color particles and second color particles; and a dispersion medium that disperses the color particles for display, wherein the second color particles have a larger particle diameter than a particle diameter of the first color particles and the same charging characteristic as a charging characteristic of the first color particles, and wherein in the color particles for display, a ratio (Cs/Cl) of a charge amount Cs of the first color particles per unit area of display to a charge amount Cl of the second color particles per unit area of display is less than or equal to 5.

BRIEF DESCRIPTION OF THE DRAWINGS

Exemplary embodiments of the present invention will be described in detail based on the following figures, wherein:

FIG. 3 is a schematic line diagram illustrating the relationship between the applied voltage and the movement (display density) of color particles for display in a method of driving a display device according to an exemplary embodiment of the invention; and FIGS. 4A to 4F are schematic diagrams illustrating the method of driving the display device according to the exemplary embodiment, specifically, illustrating electrophoretic states of particle groups which vary depending on voltage states of applying between substrates and movement states of color particles for display in the method of driving the display device according to the exemplary embodiment.

DETAILED DESCRIPTION

Hereinafter, exemplary embodiments of the invention will be described.

Particle Dispersion for Display

A particle dispersion for display according to an exemplary embodiment includes color particles for display (hereinafter, referred to as "color particles") and a dispersion medium that disperses the color particles.

The color particles move in response to an electric field and include first color particles (hereinafter, small-diameter color particles) and second color particles (hereinafter, referred to as "large-diameter color particles) that have a larger diameter than that of the small-diameter color particles and the same charging characteristic as that of the small-diameter color particles.

A ratio (hereinafter, referred to as "Cs/Cl ratio") of a charge amount Cs of the small-diameter color particles per unit area of display to a charge amount Cl of the large-diameter color particles per unit area of display is less than or equal to 5.

When the particle dispersion for display according to the exemplary embodiment having the above-described configuration includes the small-diameter color particles and the large-diameter color particles, the maintainability of mixed color display of the small-diameter color particles and the large-diameter color particles is superior.

The reason is not clear, but is considered to be as follows.

Figure 1:
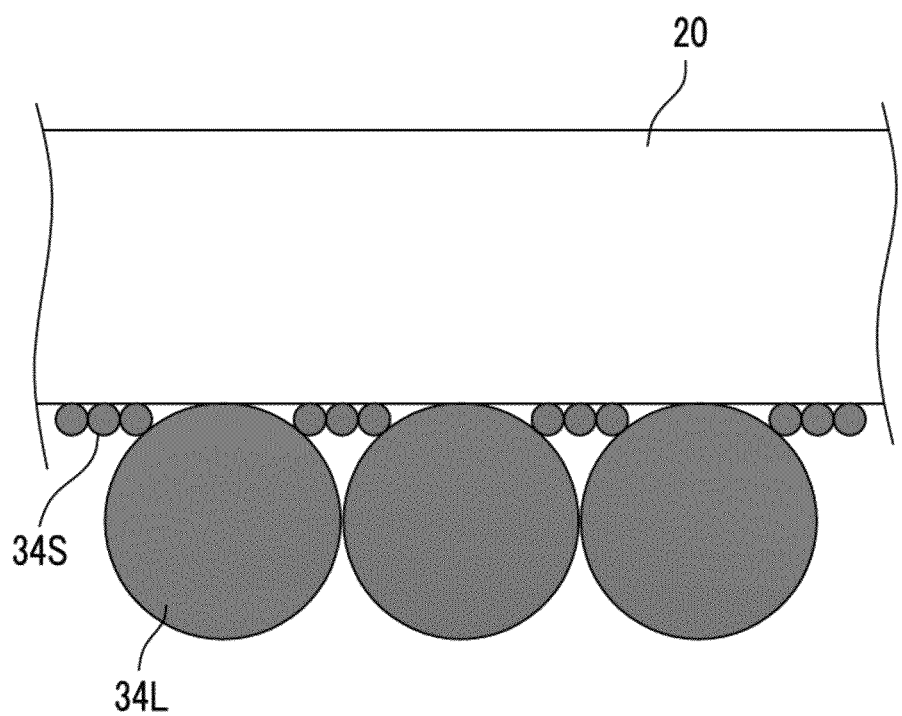
FIG. 1 is a schematic diagram illustrating the action of a particle dispersion for display according to an exemplary embodiment of the invention.

First, when mixed color display of two kinds of the color particles is realized using the small-diameter color particles and the large-diameter color particles, the small-diameter color particles are positioned on a display substrate side and the large-diameter color particles are positioned behind the small-diameter color particles (refer to FIG. 1; in FIG. 1, 20: display substrate, 34S: small-diameter color particles, 34L: large-diameter color particles)

At this time, when the small-diameter color particles and the large-diameter color particles have the same charging characteristic, it is found that the density of mixed color display is likely to deteriorate over time. The reason is considered that the large-diameter color particles receive a force of moving away from the display substrate due to its weight and a replulsive force from the smaller-diameter color particles having the same charging characteristic.

On the other hand, the Cs/Cl ratio satisfying the above-described range represents that a larger charge amount Cl of the large-diameter color particles and a smaller charge amount Cs of the smaller-diameter color particles are advantageous. Each charge amount represents the charge amount per unit area of display.

Therefore, when the Cs/Cl ratio satisfies the above-described range, if is considered that the small-diameter color particles are positioned on the display substrate side and the large diameter color particles are positioned behind small-diameter color particles; and as a result, when mixed color display is performed, an image force on the display substrate is improved and a replulsive force applied from the small-diameter color particles to the large-diameter color particles is reduced. As a result, it is considered that, the adhesion with the display substrate increases, as compared to a case where the Cs/Cl ratio does not satisfy the above-described range.

Based on the above description, it is considered that the particle dispersion for display according to the exemplary embodiment has superior maintainability of mixed color display of the small-diameter color particles and the large-diameter color particles.

The particle dispersion for display according to the exemplary embodiment may further include, as color particles, third color particles in addition to the small-diameter color particles and the large-diameter color particles. As the third color particles, for example, any color particles that, have the same or different charging characteristic as or from that of the small-diameter color particles and the large-diameter color particles may be used.

Even when the particle dispersion for display includes the third color particles, the maintainability of mixed color display is improved as long as the mixed color display is performed in a state where the small-diameter color particles are positioned on the display substrate side and the large-diameter color particles are positioned behind the small-diameter color particles.

In a case where the third color particles have the same charging characteristic as that of the small-diameter color particles and the large-diameter color particles, the maintainability for mixed color display of the third color particles and the small-diameter color particles or the large-diameter color particles is improved when the relationship between a charge amount Ct of the third color particles per unit area of display and the charge amount Cs of the small-diameter color particles per unit area of display or the charge amount Cl of the large-diameter color particles per unit area of display satisfies the following condition: a ratio of a charge amount of particles per unit area of display having a smaller volume average particle diameter to a charge amount of particles per unit area of display having a larger volume average particle diameter is less than or equal to 5 as in the case of the relationship (Cs/Cl ratio) of the small-diameter color particles and the large-diameter color particles.

In addition, the particle dispersion for display according to the exemplary embodiment may further contain, in addition to color particles, white particles for display (hereinafter, referred to as "white particles") that does not move in response to an electric field or move at a slower (in particular, extremely slower) response time to an electric field than those of the color particles (that is, the white particles may be dispersed in the dispersion medium). In this case, the color particles adopt particles of colors other than white.

Hereinafter, the respective components of the particle dispersion for display according to the exemplary embodiment will be described.

Color Particles

The color particles are positively or negatively charged and move in the dispersion when an electric field having a predetermined field intensity or higher is formed.

The color particles include at least two kinds of particles including the small-diameter color particles and the large-diameter color particles.

It is preferable that the small-diameter color particles and the large-diameter color particles have different colors and different threshold voltages (that is, charging characteristics) from each other.

The "threshold voltage" (hereinafter, also referred to as "movement starting voltage") refers to the voltage at which the color particles start moving and, specifically, refers to the drive voltage characteristic of the color particles in which, when a voltage lower than a predetermined value (absolute value) is applied, the color particles does not move; and when a voltage higher than or equal to the predetermined value (absolute value) is applied, the color particles start moving. When this threshold voltage varies depending on the respective color particles, even two kinds or more kinds of color particles having the same charging characteristic (two or more kinds of color particles having the same polarity) move independently of each other.

On the other hand, two or more kinds of color particles having different charging characteristics indicate either or both of polarities and charge amounts of the respective particles being different. However, the small-diameter color particles and the large-diameter color particles have the same charging characteristic.

Colors displayed on a display device are changed according to the movements of these color particles in the dispersion.

The ratio (Cs/Cl ratio) of the charge amount Cs of the small-diameter color particles per unit area of display to the charge amount Cl of the large-diameter color particles per unit area of display is less than or equal to 5, preferably less than or equal to 2, and more preferably less than or equal to 1.5. In this case, the Cs/Cl ratio is preferably greater than or equal to 1 from the viewpoint of making a threshold of the small-diameter color particles higher than that of the large-diameter color particles.

From the viewpoints of maintainability of mixed color display, the charge amount Cs of the small-diameter color particles per unit area of display is, for example, preferably from $0.5$ $nC/cm^2$ to $5$ $nC/cm^2$ more preferably from $0.7$ $nC/cm^2$ to $4$ $nC/cm^2$, still more preferably from $0.9$ $nC/cm^2$ to $3$ $nC/cm^2$.

Meanwhile, from the viewpoints of maintainability of mixed color display, the charge amount Cl of the large-diameter color particles per unit area of display is, for example, preferably from $0.5$ $nC/cm^2$ to $3$ $nC/cm^2$, more preferably from $0.7$ $nC/cm^2$ to $2$ $nC/cm^2$, still more preferably from $0.9$ $nC/cm^2$ to $1.5$ $nC/cm^2$.

Examples of a method of setting the charge amounts of the color particles per unit area of display and the Cs/Cl ratio within the above-described ranges include 1) a method of selecting the materials forming the color particles; 2) a method of adjusting the contents thereof; 3) a method of adjusting the sizes of the color particles; and 4) a method of adjusting the concentrations of the color particles in the particle dispersion for display. In these methods, a well-known material is selected and a well-known adjusting method is used.

The method of measuring the charge amounts of the color particles per unit area of display is as follows. A particle dispersion for display containing color particles, which are a measurement target, is prepared. Another particle dispersion for display having the same contents of the color particles as those of the prepared particle dispersion for display is sealed between substrates. As a result, an evaluation cell is prepared. A method of preparing the evaluation cell is the same as that of an evaluation cell prepared in the evaluation of Examples described below. In the evaluation cell, the distance between the substrates is 50 μm and the display area is 1 cm×1 cm.

While a voltage having a triangular waveform of ±30 V from 0.1 Hz to 0.5 Hz is applied to the evaluation cell, data regarding a current flowing through the evaluation cell is measured for each time. When the voltage is higher than a threshold of color particles, the color particles start moving and the current is observed; and when the movement of all the color particles is stopped, the current flowing along with the movement of the particles is not observed. Therefore, the data regarding the current for each time has a peak. The charge amounts of the respective color particles per unit area of display are measured by obtaining an integrated value of the peak.

It is preferable that the small-diameter color particles have a particle diameter at which the small-diameter color particles pass through gaps between the large-diameter color particles when the large-diameter color particles are close-packed. As a result, even when the large-diameter color particles reach the display substrate side first, the small-diameter color particles, which reach the display substrate side subsequently, pass through gaps between the large-diameter color particles. Accordingly, mixed color display is realized in a state where the small-diameter color particles are positioned on the display substrate side and the large-diameter color particles are positioned behind the small-diameter color particles.

Specifically, a volume average particle diameter of the small-diameter color particles is, for example, from 0.3 μm to 0.9 μm, preferably from 0.6 μm to 0.8 μm, and more preferably from 0.5 μm to 0.7 μm.

Meanwhile, a volume average particle diameter of the large-diameter color particles is, for example, from 5 μm to 20 μm, preferably from 7 μm to 15 μm, and more preferably from 8 μm to 13 μm.

Examples of the volume average particle diameters are described below in Examples, but any values of the volume average particle diameters of the small-diameter color particles and the large-diameter color particles exhibit the same maintainability of mixed color display as long as they are within the above-described range.

The volume average particle diameters of the color particles are values measured using a scanning electron microscope (SEM) image. Specifically, an image is obtained using an SEM (S-4800, manufactured by Hitachi High-Technologies Corporation), and then a diameter r1 (longest portion) of a color particle is measured for each kind of color particles. This measurement is performed for 100 color particles, volumes of r1 to r100 are obtained in terms of spherical diameter, and a cumulative value of 50% when 1st to 100th values are accumulated is set to a volume average particle diameter.

Composition of Color Particles

Examples of the color particles include resin particles; particles obtained by fixing a colorant to surfaces of the above-described resin particles; and particles obtained by containing a colorant in a resin. Other examples of the color particles include insulating metal oxide particles (for example, particles of glass beads, alumina, titanium oxide, and the like); and metal colloidal particles having a plasmon-coloring function.

Resin

Examples of a thermoplastic resin used for the color particles include homopolymer or copolymer resins of styrenes such as styrene and chlorostyrene; monoolefines such as ethylene, propylene, butylene, and isoprene; vinyl esters such as vinyl acetate, vinyl propionate, vinyl benzoate, and vinyl butyrate; α-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers such as vinyl methyl ether, vinyl ethyl ether, and vinyl butyl ether; and vinyl ketones such as vinyl methyl ketone, vinyl hexyl ketone, and vinyl isopropenyl ketone.

Examples of a thermosetting resin used for the color particles include crosslinked resins such as crosslinked copolymers including divinylbenzene as a major component and crosslinked methyl methacrylate; phenol resins, urea resins, melamine resins, polyester resins, and silicone resins.

Examples of a representative resin used for the color particles include polystyrene resins, styrene-alkyl acrylate copolymers, styrene-alkyl methacrylate copolymers, styrene-acrylonitrile copolymers, styrene-butadiene copolymers, styrene-maleic anhydride copolymers, polyethylene resins, polypropylene resins, polyester resins, polyurethane resins, epoxy resins, silicone resins, polyamide resins, modified waxes, and paraffin waxes.

In particular, as the resin used for the color particles, a resin having a charging group (hereinafter, referred to as "polymer having a charging group") is preferably used in order to charge the particles.

The polymer having a charging group is, for examples, a polymer having a cationic or anionic group.

Examples of the cationic group which is the charging group include an amine group and a quaternary ammonium group (including salts thereof). The particles are positively charged by this cationic group.

Examples of the anionic group which is the charging group include a carboxyl group, a carboxylate group, a sulfonic acid group, a sulfonate group, a phosphoric acid group, and a phosphate group. The particles are negatively charged by this anionic group.

Other examples of the charging group include a fluorine group and a phenyl group.

Specific examples of the polymer having a charging group include homopolymers of monomers having a charging group; and copolymers of monomers having a charging group and other monomers (monomers not having a charging group).

Examples of the monomers having a charging group include monomers having a cationic group (hereinafter, referred to as "cationic monomers"), monomers having an anionic group (hereinafter, referred to as "anionic monomers"), monomers having a fluorine group, and monomers having a phenyl group.

Examples of the cationic monomers are as follows. Specific examples thereof include (meth)acrylates having an aliphatic amino group such as N,N-dimethylaminoethyl (meth)acrylate, N,N-diethylaminoethyl (meth)acrylate, N,N-dibutylaminoethyl (meth)acrylate, N,N-hydroxyethylaminoethyl (meth)acrylate, N-ethylaminoethyl (meth)acrylate, N-octyl-N-ethylaminoethyl (meth)acrylate, and N,N-dihexylaminoethyl (meth)acrylate; (meth)acrylamides such as N-methylacrylamide, N-octylacrylamide, N-phenylmethylacrylamide, N-cyclohexylacrylamide, N-phenylacrylamide, N-p-methoxy-phenylacrylamide, N,N-dimethylacrylamide, N,N-dibutylacrylamide, and N-methyl-N-phenylacrylamide; aromatic substituted ethylene monomers having a nitrogen-containing group such as dimethylamino styrene, diethylamino styrene, dimethylamino methyl styrene, and dioctylamino styrene; and nitrogen-containing vinyl ether monomers such as vinyl-N-ethyl-N-phenylaminoethyl ether, vinyl-N-butyl-N-phenylaminoethyl ether, triethanolamine divinyl ether, vinyl diphenyl aminoethyl ether, N-vinyl hydroxyethyl benzamide, and m-aminophenyl vinyl ether.

For example, as the cationic monomers, nitrogen-containing heterocyclic compounds are preferable, and particularly preferable examples thereof include pyrroles such as N-vinyl pyrrole; pyrrolines such as N-vinyl-2-pyrroline and N-vinyl-3-pyrroline; pyrrolidines such as N-vinyl pyrrolidine, vinylpyrrolidine amino ether, and N-vinyl-2-pyrrolidone; imidazoles such as N-vinyl-2-methyl imidazole; imidazolines such as N-vinyl imidazoline; indoles such as N-vinyl indole; indolines such as N-vinyl indoline; carbazoles such as N-vinyl carbazole and 3,6-dibromo-N-vinyl carbazole; pyridines such as 2-vinyl pyridine, 4-vinyl pyridine, and 2-methyl-5-vinyl pyridine; piperidines such as (meth)acrylic piperidine, N-vinyl piperidine, and N-vinyl piperidine; quinolines such as 2-vinyl quinoline and 4-vinyl quinoline; pyrazoles such as N-vinyl pyrazole and N-vinyl pyrazoline;

oxazoles such as 2-vinyl oxazole; and oxazines such as 4-vinyl oxazine and morpholinoethyl (meth)acrylate.

In the cationic monomers, a salt structure may be formed to obtain a quaternary ammonium salt before or after polymerization. A quaternary ammonium salt may be obtained by, for example, causing a cationic group to react with an alkyl halide or a tosylate.

Examples of the anionic monomers include carboxylic acid monomers, sulfonic acid monomers, and phosphoric acid monomers.

Examples of the carboxylic acid monomers include (meth) acrylic acid, crotonic acid, itaconic acid, maleic acid, fumaric acid, citraconic acid, and anhydrides and monoalkyl esters thereof; vinyl ethers having a carboxyl group such as carboxylethyl vinyl ether and carboxylpropyl vinyl ether; and salts thereof.

Examples of the sulfonic acid monomers include styrene sulfonic acid, 2-acrylamide-2-methylpropane sulfonic acid, 3-sulfopropyl (meth)acrylic acid esters, bis-(3-sulfopropyl)-itaconic acid esters; and salts thereof. In addition, other examples of the sulfonic acid monomers include sulfuric acid esters of 2-hydroxyethyl (meth)acrylic acid; and salts thereof.

Examples of the phosphoric acid monomers include vinyl phosphonic acid, vinyl phosphate, acid phosphoxyethyl (meth)acrylate, acid phosphoxypropyl (meth)acrylate, bis (methacryloyoxyethyl)phosphate, diphenyl-2-methacyloyloxyethyl phosphate, diphenyl-2-acryloyloxyethyl phosphate, dibutyl-2-methacryloyloxyethyl phosphate, dibutyl-2-acryloyloxyethyl phosphate, and dioctyl-2-(meth) acryloyloxyethyl phosphate.

In the anionic monomers, a salt structure may be formed to obtain an ammonium salt before or after polymerization. An ammonium salt is obtained by causing an anionic group to react with a tertiary amine or a quarternary ammonium hydroxide.

Examples of the monomers having a fluorine group include (meth)acrylate monomers having a fluorine group such as trifluoroethyl (meth)acrylate, pentafluoropropyl (meth)acrylate, perfluoroethyl (meth)acrylate, perfluorobutylethyl (meth)acrylate, perfluorooctylethyl (meth)acrylate, perfluorodecylethyl (meth)acrylate, trifluoromethyl trifluoroethyl (meth)acrylate, and hexafluorobutyl (meth)acrylate.

Examples of the monomers having a phenyl group include styrene, phenoxyethylene glycol (meth)acrylate, phenoxypolyethylene glycol (meth)acrylate, 2-hydroxy-3-phenoxypropyl (meth)acrylate, and phenoxyethylene glycol (meth) acrylate.

Examples of other monomers include water-soluble monmers (for example, monomers having a hydroxyl group). Specific examples of the water-soluble monomers include hydroxyethyl (meth)acrylate, hydroxybutyl (meth)acrylate, monomers having an ethylene oxide unit (for example, (meth)acrylates of alkyloxy oligo ethylene glycol such as tetraethylene glycol monomethyl ether (meth)acrylate, and (meth)acrylate having polyethylene glycol at a terminal), (meth)acrylic acid and salts thereof, maleic acid, (meth)acrylamide-2-methylpropane sulfonic acid and salts thereof, vinyl sulfonic acid and salts thereof, and vinyl pyrrolidone.

Examples of other monomers include well-known non-ionic monomers other than the above-described examples.

"(Meth)acryl" represents both "acryl" and "methacryl". "(Meth)acrylo" represents both "acrylo" and "methacrylo"; and "meth(acrylate)" represents both "acrylate" and "methacrylate".

Colorant

Examples of a colorant used for the color particles include organic or inorganic pigments and oil-soluble dyes.

Examples of the colorants include well-known colorants including magnetic powder such as magnetite and ferrite, carbon black, titanium oxide, magnesium oxide, zinc oxide, phthalocyanine copper cyan colorants, azo yellow colorants, azo magenta colorants, quinacridone magenta colorants, red colorants, green colorants, and blue colorants.

Specifically, representative examples of the colorant include aniline blue, calcoil blue, chrome yellow, ultramarine blue, Dupont oil red, quinoline yellow, methylene blue chloride, phthalocyanine blue, malachite green oxalate, lampblack, rose bengal, C.I. Pigment Red 48:1, C.I. Pigment Red 122, C.I. Pigment Red 57:1, C.I. Pigment Yellow 97, C.I. Pigment Blue 15:1, and C.I. Pigment Blue 15:3.

The content of the colorant is preferably from 5% by weight to 99% by weight and more preferably from 10% by weight to 80% by weight with respect to a resin included in the color particles.

Other Components

Optionally, the color particles may further contain a charge-controlling agent. As the charge-controlling agent, a well-known material used as an electrophotographic toner material may be used, and examples thereof include cetylpyridyl chloride, quaternary ammonium salts such as BONTRON P-51, BONTRON P-53, BONTRON E-84, and BONTRON E-81 (manufactured by Orient Chemical Industries Co., Ltd.), salicylic acid metal complexes, phenol condensates, tetraphenyl compounds, metal oxide particles, and metal oxide particles having surfaces treated with various coupling agents.

Other Configurations

Surface Treatment Using Silicone Compound

Surfaces of the color particles may be treated with a silicone compound having a reactive group. That is, each color particle may have a core-shell structure in which the color particle is used as a core particle and a coating layer of a silicone compound is formed on a surface of the color particle.

When the color particle has the core-shell structure, it is preferable that the core particle contain a resin having a reactive group (for example, a hydroxyl group, carboxyl group, a carbonyl group, or an amine group) which is reactive with the reactive group of the silicone compound. Preferable examples of the resin having a reactive group include melamine resins, quart amine resins, styrene-acrylic acid copolymers, styrene-methacrylic acid copolymers, styrene-maleic anhydride copolymers, polyvinyl alcohol resins, polyvinyl butyral resins, gelatins, and agars.

In addition, when the silicone compound has a charging group, the core particle may contain a resin not having a charging group.

Examples of the silicone compound include copolymer resins formed of a monomer having a silicone chain and a monomer having a reactive group and, optionally, a monomer having a charging group and another monomer.

It is preferable that the silicone compound be a silicone compound not having an OH group (that is, a silicone compound which does not contain a monomer having an OH group as a polymer component).

When protons are deprived by another kind of color particles and the white particles, which are other components, and by a functional group, which is contained in a resin constituting an insulating layer or a capsule wall of a substrate surface, there are problems in that an OH group is negatively charged; and as a result, a part of particles which are designed to be positively charged are negatively charged and a part of particles which are designed to be negatively charged are charged more than necessary. However, by using the silicone compound not having an OH group, the above-described problems are prevented and particles having a desired charging characteristic are obtained.

Examples of the monomer having a silicone chain include macromonomers having a silicone chain such as a dimethyl silicone monomer having a (meth)acrylate group at a terminal (silicone compounds represented by the following structural formula 1; for example, SILAPLANE FM-0711, FM-0721, and FM-0725 manufactured by JNC Corporation, X-22-174DX, X-22-2426, and X-22-2475 manufactured by Shin-Etsu Chemical Co., Ltd.).

Structural Formula 1

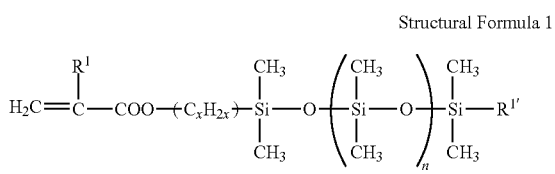

In the structural formula 1, $R^1$ represents a hydrogen atom or a methyl group; $R^{1'}$ represents a hydrogen atom or an alkyl group having from 1 to 4 carbon atoms; n represents a natural number (for example, one of from 1 to 1000 and preferably from 3 to 100); and x represents an integer of from 1 to 3.

Examples of the monomer having a reactive group include glycidyl (meth)acrylates having an epoxy group, isocyanate monomers having an isocyanate group (for example, KARENZ AOI (2-isocyanate ethyl acrylate) and KARENZ MOI (2-isocyanate ethyl methacrylate) manufactured by Showa Denko K.K.), and isocyanate monomers having a blocked isocyanate group (for example, KARENZ MOI-BM (2-(O-[1'-Methylpropylideneamino]carboxyamino)ethyl methacrylate) and KARENZ MOI-BP (2-[(3,5-dimethylpyrazolyl)carbonylamino]ethyl methacrylate) manufactured by Showa Denko K.K.).

The blocked isocyanate group refers to a state after a reaction of an isocyanate group and a substituent and a state in which the isocyanate group is not reactive with the substituent which is to be dissociated by heating. As a result, the reactivity of the isocyanate group is suppressed, and the isocyanate group becomes reactive when the substituent is dissociated by heating.

Examples of the monomer having a charging group are the same as those described above in the polymer having a charging group.

Examples of other monomers include monomers not having a charging group which are the same as those described above in the polymer having a charging group.

In the silicone compound, the content of the monomer having a silicone chain is preferably from 20% by weight to 95% by weight and more preferably from 50% by weight to 90% by weight with respect to the total weight of all the monomers.

The content of the monomer having a reactive group is preferably from 3% by weight to 60% by weight and more preferably from 5% by weight to 40% by weight with respect to the total weight of all the monomers.

The weight average molecular weight of the silicone compound is preferably 500 to 1,000,000 and more preferably 5,000 to 500,000.

The amount of a surface of a core particle treated (coated) with the silicone compound is, for example, 0.5% by weight to 10% by weight and preferably 1.0% by weight to 6% by weight with respect to the core particle.

External Additives

Optionally, external additives may be attached onto surfaces of the color particles. It is preferable that the color of the external additives be transparent so as not to affect the colors of the color particles.

Examples of the external additives include inorganic particles of metal oxide such as silicon oxide (silica), titanium oxide, and alumina. In order to adjust the charging property, fluidity, and environmental dependency of the color particles, the external additives may be subjected to a surface treatment with a coupling agent or silicone oil.

Examples of the coupling agent include positively charged coupling agents such as aminosilane coupling agents, aminotitanium coupling agents, and nitrile coupling agents; and negatively charged coupling agents such as silane coupling agents not containing a nitrogen atom (formed of atoms other than a nitrogen atom), titanium coupling agents, epoxy silane coupling agents, and acrylic silane coupling agents.

Examples of the silicone oil include positively charged silicone oil such as amino-modified silicone oil; and negatively charged silicone oil such as dimethyl silicone oil, alkyl-modified silicone oil, α-methylsulfone-modified silicone oil, methylphenyl silicone oil, chlorophenyl silicone oil and fluorine-modified silicone oil.

These coupling agents and silicon oil are selected according to the desired resistance of the external additives.

The average primary particle diameter of the external additives is, for example, from 1 nm to 100 nm and preferably from 5 nm to 50 nm. However, the average primary particle diameter is not limited thereto.

The amount of the external additives externally added to the color particles is, for example, from 0.01 part by weight to 3 parts by weight and preferably from 0.05 part by weight to 1 part by weight with respect to 100 parts by weight of the color particles.

It is preferable that the amount of the external additives externally added be adjusted in consideration of the particle diameter of the color particles and the particle diameter of the external additives. When the amount of the external additives is within the above-described range, there are advantageous effects in that the external additives are not liberated from the surfaces of the color particles and are not attached onto surfaces of another kind of the color particles; and as a result, a desired charging characteristic is easily obtained.

Among plural kinds of color particles, the external additives may be added to only one kind of color particles; or may be added to plural kinds or all kinds of color particles. When the external additives are added to the surfaces of all kinds of color particles, it is preferable that the external additives be added to the surfaces of the color particles by an impact pulse; or the surfaces of the color particles be heated such that the external additives are firmly fixed onto the surfaces of the color particles. With this configuration, the external additives are not liberated from the color particles and the external additives having opposite polarities do not aggregate. As a result, an aggregate of the external additives that is difficult to dissociate using an electric field is prevented from being formed and deterioration in image quality is prevented.

Other Properties of Color Particles

The volume average particle diameters of the small-diameter color particles and the large-diameter color particles are as described above. When particle dispersion for display includes the third color particles in addition to the small-diameter color particles and the large-diameter color particles, a volume average particle diameter of the third color particles is, for example, from 0.05 μm to 20 μm and preferably from 0.1 μm to 15 μm. The diameters of the color particles are not particularly limited, and preferable ranges thereof are determined according to the purposes.

A concentration of the color particles (concentration in a particle dispersion for display which is sealed between a pair of substrates of a display device) is not particularly limited as long as a desired display color is obtained, but is preferably from 0.01% by weight to 50% by weight.

It is preferable that a concentration of the color particles in a particle dispersion for display which is sealed between a pair of substrates of a display device be also within the above-described range. In addition, it is preferable that the concentration of the color particles be adjusted by the distance between a pair of substrates of a display device. When a desired hue is obtained, the greater the distance between a pair of substrates of a display device, the lower the particle concentration; and the less the distance, the higher the particle concentration.

Method of Preparing Color Particles

As a method of preparing color particles, any well-known methods of the related art may be used. Specific examples are as follows.

1) A method of preparing color particles described in JP-A-7-325434 in which a resin and a pigment and, optionally, a charge-controlling agent are prepared according to a desired mixed ratio; the resin is heated and melted; the pigment is added thereto, followed by mixing, dispersing, and cooling; and the resultant is pulverized using a pulverizer such as a jet mill, a hammer mill, or a turbo mill 2) A method of preparing color particles using a polymerization method such as a suspension polymerization method, an emulsion polymerization method, or an dispersion polymerization method; a coacervation method; a melt-dispersion method; and an emulsion aggregation method 3) A method of preparing color particles by dispersing and kneading raw materials of a resin, a colorant, and a dispersion medium and, optionally, a charge-controlling agent at a temperature lower than at least one of decomposition points of the resin, the colorant, and the charge-controlling agent, in which the dispersion medium does not boil when the resin is thermoplastic (specifically, a method of preparing color particles in which a resin and a colorant and, optionally, a charge-controlling agent are heated and melted in a dispersion medium using, for example, a planetary mixer or a kneader; and the melted, mixture is cooled under stirring using the dependency of solvent solubility of the resin on temperature, followed by solidification and precipitation)

4) A method of preparing color particles in which the above-described raw materials are put into an appropriate container for dispersion and kneading which is provided with granular media, for example, into a heated vibration mill such as an attritor or a heated bail mill, followed by dispersion and kneading in this container at a preferable temperature range of, for example, from 80° C. to 160° C.

Preferable examples of the granular media include steel such as stainless steel or carbon steel, alumina, zirconia, and silica. In the method of preparing color particles using granular media, it is preferable that liquid raw materials prepared in advance be further dispersed in the container by the granular media; and the dispersion medium be cooled to cause the resin containing the colorant to precipitate in the dispersion medium. During and after cooling, it is preferable that at least one of a shearing force and an impact force be applied to the granular media while maintaining the moving state in order to reduce the particle diameter of the obtained color particles.

White Particles

Configuration of White Particles

Examples of the white particles include spherical particles of a benzoguanamine-formaldehyde condensate; spherical particles of a benzoguanamine-melamine-formaldehyde condensate; spherical particles of a melamine-formaldehyde condensate (EPOSTAR manufactured by Nippon Shokubai Co., Ltd.); spherical particles of titanium oxide-containing cross-linked polymethylmethacrylate (MBX-WHITE manufactured by Sekisui Plastics Co., Ltd.); spherical particles of cross-linked polymethylmethacrylate (CHEMISNOW-MX manufactured by Soken Chemical & Engineering Co., Ltd.); particles of polytetrafluoroethylene (LUBRON L manufactured by Daikin Industries Ltd., and SST-2 manufactured by Shamrock Technologies Inc.); spherical particles of carbon fluoride (CF-100 manufactured by Nippon Carbon Co., Ltd., CFGL and CFGM manufactured by Daikin Industries Ltd.); spherical particles of silicone resin (TOSPEARL manufactured by Toshiba Silicone Co., Ltd.); spherical particles of titanium oxide-containing polyester (BIRYUSHIA PL1000 WHITE T manufactured by Nippon Paint Co., Ltd.); titanium oxide-containing polyester acrylic spherical particles (KONAC No. 181000 WHITE manufactured by NOF Corporation); and spherical particles of silica (HIPRESICA manufactured by UbeNitto Kasei).

In particular, it is preferable that the white particles be obtained by coating a white pigment (for example, titanium oxide) with a resin, from the viewpoint of increasing the reflectance of white display.

This coating resin is not particularly limited, but a polymer containing at least one kind of vinyl biphenyl compound as a polymer component is preferable from the viewpoints of increasing the reflectance of white display and reducing the precipitation of the white particles and the movement thereof due to an electric field.

Examples of the white pigment include zinc oxide, basic lead carbonate, basic lead sulfate, lithopone, zinc sulfate, titanium oxide, zirconia oxide, antimony oxide, and barium sulfate.

Among these, as the white pigment, titanium oxide is preferable from the viewpoint of increasing the reflectance of the white particles and suppressing the precipitation thereof.

Titanium oxide particles may be prepared using any method of a sulfuric acid method, a chlorine method, and a gas phase method. The crystalline system of titanium oxide may be any one of anatase type, rutile type and brookite type, but the rutile type is preferable. It is preferable that aluminum oxide, aluminum hydroxide, silicon oxide, and the like be added to the titanium oxide particles from the viewpoint of suppressing the photocatalytic property.

As the white particles, particles of a polymer containing at least one kind of vinyl biphenyl compound as a polymer component are preferable from the viewpoints of increasing the reflectance of white display and reducing the precipitation of the white particles and the movement thereof due to an electric field.

It is preferable that the difference in refractive index between a material forming the white particles and the dispersion medium be greater from the viewpoint of high reflectance. The difference in refractive index is at least greater than or equal to 0.1 and preferably greater than or equal to 0.3. However, the refractive index of the white particles may be greater than or may be less than that of the dispersion medium.

Other Properties of White Particles

The white particles serve to display white as, for example, the background color of a display medium. Therefore, it is preferable that the particle dispersion for display contain the white particles in a state of floating in the dispersion medium.

It is preferable that the white particles have a charging perperty having a polarity opposite to that of the color particles. Alternatively, it is preferable that the white particles have a small amount of charge and move at a slower response time to an electric field than those of color particles, and it is particularly preferable that the white particles do not substantially move in response to an electric field. Specifically, under the same electric field, the response time of the white particles is 1/5 or less and preferably 1/10 or less that of the color particles.

A volume average particle diameter of the white particles is preferably from 0.05 µm to 20 µm and more preferably from 0.1 µm to 1 µm. When the volume average particle diameter of the white particles is greater than or equal to 0.05 µm, the reflectance is easily increased. When the volume average particle diameter of the white particles is less than or equal to 20 µm, the precipitation of the white particles is easily suppressed.

A concentration of the white particles (concentration in a particle dispersion for display which is sealed between a pair of substrates of a display medium) is, for example, preferably from 1% by volume to 50% by volume and more preferably 2% by volume to 30% by volume.

When the concentration of the white particles is within the above-described range, there are advantageous effects in that an increase in the viscosity of the dispersion medium, caused by the dispersion of the white particles for display, is suppressed while increasing the reflectance of white display; and as a result, deterioration in the display response caused by the color particles is easily suppressed.

It is preferable that a concentration of the white particles in a particle dispersion for display which is sealed between a pair of substrates of a display medium be also within the above-described range. In addition, it is preferable that the concentration of the white particles for display be adjusted by the distance between a pair of substrates of a display medium. When a desired hue is obtained, the greater the distance between a pair of substrates of a display medium, the lower the particle concentration; and the less the distance, the higher the particle concentration.

Method of Preparing White Particles

Examples of a method of preparing the white particles are the same as those of the method of preparing the color particles.

Dispersion Medium

It is preferable that the dispersion medium be an insulating liquid. "Insulating" described herein refers to the volume resistivity value being less than or equal to $10^{11}$ Ω·cm.

Specific examples of the insulating liquid include hexane, cyclohexane, toluene, xylene, decane, hexadecane, kerosene, paraffin, isoparaffin, silicone oil, high-purity petroleum, ethylene glycol, alcohols, ethers, esters, dimethylformamide, dimethylacetamide, dimethyl sulfoxide, 1-methyl-2-pyrrolidone, N-methylformamide, acetonitrile, tetrahydrofuran, propylene carbonate, ethylene carbonate, benzine, diisopropylnaphthalene, olive oil, trichlorotrifluoroethane, tetrachloroethane, dibromotetrafluoroethane, and the like; and mixtures thereof.

Among these, silicone oil is preferably used as the dispersion medium.

Specific examples of the silicone oil include silicone oil in which a hydrocarbon group is bonded to a siloxane bond (for example, dimethyl silicone oil, diethyl silicone oil, methylethyl silicone oil, methylphenyl silicone oil, or diphenyl silicone oil). Among these, dimethyl silicone oil is particularly preferable.

Additive of Dispersion Medium

Optionally, an oxide, an alkali, a salt, a dispersion stabilizer, a stabilizer for preventing oxidation or absorbing ultraviolet rays, an antibacterial agent, a preservative, and the like may be added to the dispersion medium. In this case, it is preferable that the addition be performed such that, the volume resistivity value is within the above-described range.

The charge-controlling agent may be added to the dispersion medium. Examples of the charge-controlling agent include an anionic surfactant, a cationic surfactant, an amphoteric surfactant, a nonionic surfactant, a fluorine surfactant, a silicone surfactant, a metal soap, an alkyl phosphate, or a succinimide.

Examples of these surfactants are as follows.

Nonionic Surfactant

Polyoxyalkylene alkylphenol ethers such as polyoxyethylene nonylphenol ether and polyoxyethylene octylphenyl ether;

Polyoxyalkylene ethers such as polyoxyethylene cetyl ether and polyoxypropylene ether;

Glycols such as monool type polyoxyalkylene glycol, diol type polyoxyalkylene glycol and triol type polyoxyalkylene glycol;

Alkyl alcohol ethers such as primary linear alcohol ethoxylate including octylphenol ethoxylate and secondary linear alcohol ethoxylate;

Polyoxyalkylene alkyl esters such as polyoxyethylene lauryl ester;

Sorbitan fatty acid esters such as sorbitan monolaurate, sorbitan dilaurate, and sorbitan sesquipalmitate;

Polyoxyethylene sorbitan esters such as polyoxyethylene sorbitan monolaurate, polyoxyethylene sorbitan dilaurate, and polyoxyethylene sorbitan sesquilaurate;

Fatty acid esters such as saturated fatty acid stearyl ester, unsaturated fatty acid stearyl ester, and stearic acid polyethylene glycol ester;

Fatty acids such as stearic acid and oleic acid and amide compounds of these fatty acids; and Polyoxyethylene alkyl amines, higher fatty acid monoethanolamides, higher fatty acid diethanolamides, amide compounds, and alkanol amides.

Anionic Surfactant

Carboxylic acid salts such as polycarboxylic acid type polymer activator and rosin soap;

Alcohol sulfuric: ester salts such as castor oil sulfuric ester salt, sodium salt of lauryl alcohol sulfuric ester, amine salt of lauryl alcohol sulfuric ester, and sodium salt of higher alcohol sulfuric ester;

Sulfuric ester salts such as amine salt of lauryl alcohol ether sulfuric ester, sodium salt of lauryl alcohol ether sulfuric ester, amine salt, of synthesized higher alcohol ether sulfuric ester, sodium salt of synthesized higher alcohol ether sulfuric ester, amine salt of alkylpolyether sulfuric ester, sodium salt of alkylpolyether sulfuric ester, amine salt of natural alcohol ethylene oxide (EO) adduct sulfuric ester, sodium salt of natural alcohol ethylene oxide (EO) adduct sulfuric ester, amine salt of synthetic alcohol ethylene oxide (EO) adduct sulfuric ester, sodium salt of synthetic alcohol ethylene oxide (EO) adduct sulfuric ester, amine salt of alkyl phenol ethylene oxide (EO) adduct sulfuric ester, sodium salt of alkyl phenol ethylene oxide (EO) adduct sulfuric ester, amine salt, of polyoxyethylene nonylphenyl ether sulfuric ester, sodium salt of polyoxyethylene nonylphenyl ether sulfuric ester, amine salt of polyoxyethylene polycyclic phenyl ether sulfuric ester, and sodium salt of polyoxyethylene polycyclic phenyl ether sulfuric ester;

Sulfonic acid salts such as amine salts of alkylarylsulfonic acid, sodium salts of alkylarylsulfonic acid, amine salt of naphthalenesulfonic acid, sodium salt of naphthalenesulfonic acid, amine salts of alkylbenzenesulfonic acid, sodium salts of alkylbenzenesulfonic acid, naphthalenesulfonic acid condensate, and naphthalenesulfonic acid formalin condensate; and Polyoxyalkylene sulfonic acid salts such as amine salt of polyoxyethylene nonylphenyl ether sulfonic acid and sodium salt of polyoxyethylene nonylphenyl ether sulfonic acid.

Cationic Surfactant

Alkyltrimethyl amine quaternary ammonium salts

Quaternary ammonium salts such as tetramethylamine salt and tetrabutylamine salt;

Acetates represented by $(RNH_3)(CH_3COO)$ (wherein R represents stearyl, cetyl, lauryl, oleyl, dodecyl, palm, soybean, or beef tallow);

Benzylamine quaternary ammonium salts such as lauryldimethylbenzyl ammonium salt (for example, halide salt or amine salt), stearyldimethylbenzyl ammonium salt (for example, halide salt or amine salt), and dodecyldimethylbenzyl ammonium salt (for example, halide salt or amine salt); and Polyoxyalkylene quaternary ammonium salts represented by $R(CH_3)N(C_2H_4O)_m H(C_2H_4O)_n \cdot X$ (wherein R represents stearyl, cetyl, lauryl, oleyl, dodecyl, palm, soybean, or beef tallow and X represents a halogen or an amine)

Amphoteric Surfactant

Betaine surfactants

The content of the charge-controlling agent is, for example, greater than or equal to 0.01% by weight, preferably less than or equal to 20% by weight, and more preferably from 0.05% by weight to 10% by weight with respect to the total solid content of all the particles.

When the content of the charge-controlling agent is greater than or equal to 0.01% by weight, there are advantageous effects in that the desired charge controlling effect is easily obtained. When the content is less than or equal to 20% by weight, there are advantageous effects in that an excess increase in the electric conductivity of the dispersion medium is easily suppressed.

A polymer may be added to the dispersion medium. As the polymer, polymer gel, macromolecular polymer, or the like is preferable.

Properties of Dispersion Medium

In an environment of a temperature of, for example, 25° C., the specific gravity of the dispersion medium is preferably from 0.6 g/cm³ to 1.2 g/cm³ more preferably from 0.7 g/cm³ to 1.1 g/cm³, and still more preferably from 0.7 g/cm³ to 1.0 g/cm³.

When the specific gravity of the dispersion medium is within the above-described range, there are advantageous effects in that the precipitation of the white particles for display is easily suppressed.

In an environment of a temperature of, for example, 20° C., the viscosity of the dispersion medium is preferably from 0.1 mPa·s to 100 mPa·s, more preferably from 0.1 mPa·s to 50 mPa·s, and still more preferably from 0.1 mPa·s to 20 mPa·s.

Other Configurations of Particle Dispersion for Display

The particle dispersion for display according to the exemplary embodiment may be embraced by a capsule wall. That is, capsule particles may contain the color particles and the dispersion medium and, optionally, may further contain the white particles.

Preferable examples of a major material forming the capsule wall include gelatins, formalin resins, and urethane resins. Among these, gelatins are most preferable.

Examples of gelatins include so-called alkali-treated gelatins subjected to a treatment using lime or the like in the derivation process thereof from collagen; so-called acid-treated gelatins subjected to a treatment using hydrochloric acid; so-called oxygen-treated gelatins subjected to a treatment using hydrolytic enzyme; so-called gelatin derivatives (for example, phthalated gelatin, succinated gelatin, and trimellitated gelatin) obtained by treating and reforming an amino group, an imino group, a hydroxyl group, or a carboxyl group, which is a functional group included in the gelatin molecules, with a reagent having a group which is reactive with the functional group; and modified gelatins which are well-known in the related art and described, for example, in line 6, the lower left column, page 222 to the bottom line, the upper left column, page 225 of JP-A-62-215272.

Examples of a crosslinking agent used when a polyelectrolyte such as gelatin is used for the capsule wall include glyoxal, glutaraldehyde, succinaldehyde, dicarboxylic acid (for example, oxalic acid, succinic acid, fumaric acid, maleic acid, malic acid, glutaric acid, adipic acid, or 2,3-O-isopropylidene tartrate), diacid chlorides (for example, succinyl chloride, fumaryl chloride, glutaryl chloride, or adipoyl chloride), and tricarboxylic acid (for example, citric acid, 1,2,3-propanetricarboxylic acid, hemimellitic acid, trimellitic acid, or trimesic acid).

JP-A-2005-522313 discloses a crosslinking reaction using an enzyme (for example, transglutaminase). For example, as the crosslinking agent, such an enzyme causing a crosslinking reaction may be used.

Other examples of the crosslinking agent include those described in JP-A-2009-531532 such as epoxy resins, 2-hydroxyalkylamides, tetramethoxymethyl glyceryl, polyaziridine, polycarbodiimide, isocyanates, blocked isocyanates, drying oils (for example, triglycerides, glycerol epoxy esters, and triesters of fatty acids), aliphatic amines, phenols, polyisocyanates, amines, urea, carboxylic acids, alcohols, polyethers, urea formaldehyde, melamines, aldehydes, salts of polyvalent anions.

The crosslinking agent may be used in combination with a catalyst which promotes the crosslinking reaction thereof. Examples of the catalyst include those described in JP-A-2009-531532 such as alcohols, phenols, weak acids, amines, metal salts, urethanes, chelates, organometallic materials, photoinitiators, free radical initiators, onium salts of strong acids.

It is selected according to the purposes whether at least one of the crosslinking agent and the catalyst is added to the wafer phase to be used; or is added to the internal phase (oil phase) to cause a crosslinking reaction in an organic solvent.

Examples of an emulsifying device used in an emulsification process for forming the capsule wall include well-known emulsifying units such as a high-speed stirrer (dissolver), a homogenizer, and an inline mixer. In particular, a microreactor or a micromixer is preferably used.

In the well-known emulsifying device, a region to which a shearing force necessary for emulsification is applied is limited to the extreme vicinity of an emulsifying blade. Therefore, a shearing force is unevenly applied to a region distant from the emulsifying blade and thus a particle diameter distribution of dispersion droplets may be wide. In addition, an ultrasonic disperser is used in a laboratory-scale or small-size production scale and has problems in production, cost, control of particle diameter distribution in a production system requiring high production.

Regarding this point, Japanese Patent No. 2630501 discloses an emulsifying method using a so-called cylindrical mill as an emulsifying method for solving the phenomenon in which the particle diameter distribution is widened when the above-described emulsifying units are used. In this emulsifying method, an inner cylinder revolves in a fixed outer cylinder; and a mixed liquid of a dispersion medium and a dispersion liquid passes through a clearance between the inner cylinder and the outer cylinder to obtain an emulsion. In this method, the mixed liquid is supplied to the clearance from a side of one end of the outer cylinder along the circumference in a tangent direction; and a uniform shearing force is applied over the inner cylinder length while the mixed liquid rotates and moves in the clearance between the inner and outer cylinders, thereby achieving sufficient emulsification. According to this emulsifying method, an emulsion having an extremely narrow particle diameter distribution is obtained. Since the particle diameter of liquid droplets obtained in this method depends on the size of the clearance between the inner and outer cylinders, it is difficult to obtain emulsion particles having a given particle diameter or less. The particle diameter of liquid droplets obtained in this method is limited to approximately 10 μm, and it is difficult to obtain liquid droplets having a particle diameter of several tens of μm or less.

On the other hand, recently, since a so-called microreactor has been used in the fine chemical field, biochemical field, and the like, significant development has been achieved (refer to W. Ehrfeld, V. Hessel, H. Lowe, "Microreactor", 1Ed. (2000), WILEY-VCH).

Generally, the microreactor is the collective term that refers to a reaction device having micro-scale channels (microchannels). For example, while two kinds of liquids pass through different microchannels, extremely thin liquid films come into contact with each other. At this time, a material moves through the interface between the films and a reaction is caused.

The microreactor is used for mixing or separation of two or more kinds of liquids as well as for the chemical reaction. In particular, the microreactor used for mixing is called a micromixer. The micromixer forms a structure in which liquid films of two different kinds of liquids to be mixed are laminated and causes the liquids to pass through a fine channel, thereby mixing them. For example, an emulsion is prepared by using an oil-phase liquid and a water-phase liquid as the liquids. WO 00/62913 discloses a disperser (micromixer) that performs dispersion using such a microreactor. This disperser spatially divides liquid layers (liquid films) by causing liquid currents of a liquid A and a liquid B to pass through different micro-scale channels (microchannels); and disperses the liquid A or the liquid B into fine liquid droplets by combining the divided liquid currents and causing the combined liquid current to pass through a fine channel. At this time, a mechanical oscillator promotes the liquid to be dispersed into liquid droplets.

JP-A-2002-282678 and JP-A-2002-282679 disclose the details of techniques of forming a capsule wall with emulsification using a microreactor or a micromixer having such a microchannel. The exemplary embodiment may adopt such techniques.

Uses of Particle Dispersion for Display

The particle dispersion for display according to the exemplary embodiment is used for a display medium, a light control medium (light control device), and the like. Examples of the display medium and the light control medium (light control device) include a well-known device that moves particle groups in a direction opposite to electrode (substrate) surfaces; a device (so-called in-plane type device) that moves particle groups in a direction parallel to electrode (substrate) surfaces; and a hybrid device that is a combination of the above-described devices.

Display Device (Display Medium)

Hereinafter, a display device according to an exemplary embodiment of the invention will be described with reference to the drawings.

Figure 2:
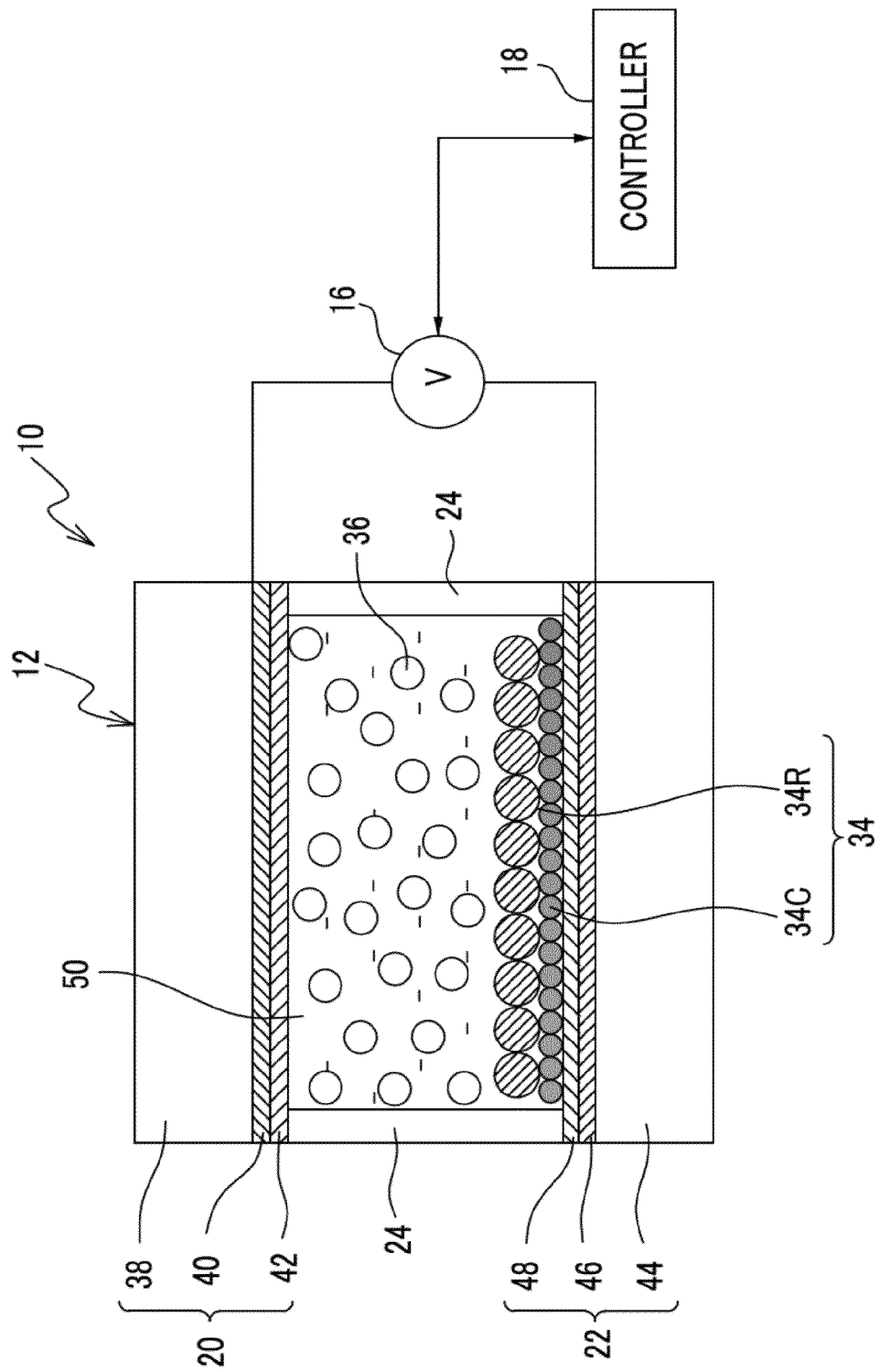
FIG. 2 is a schematic diagram illustrating a display device according to an exemplary embodiment.

FIG. 2 is a schematic diagram illustrating the display device according to the exemplary embodiment.

A display device 10 according to the embodiment has a configuration in which the particle dispersion for display according to the exemplary embodiment is applied to a particle dispersion for display that contains a particle dispersion for display that includes color particle groups 34, a white particle group 36, and a dispersion medium 50 in a display medium 12. That is, the groups of the color particles are applied to the color particle groups 34; and the group of white particles is applied to the white particle group 36.

Specifically, the color particle groups 34 include a cyan particle group 34C of cyan color; and a red particle group 34R of red color that has a larger particle size than that of the cyan particle group 34C and the same charging characteristic as that of the cyan particle group 34C.

Among the color particle groups 34, the group of the small-diameter color particles of the particle dispersion for display according to the exemplary embodiment is applied to the cyan particle group 34C; and the group of the large-diameter color particles thereof is applied to the red particle group 34R.

As illustrated in FIG. 2, the display device 10 according to the exemplary embodiment includes, for example, the display medium 12, a voltage application portion 16 (an example of the voltage application unit), and a controller 18.

Display Medium

As illustrated in FIG. 2, the display medium 12 includes, for example, a display substrate 20 that is a display surface; a back substrate 22 that is disposed opposite the display substrate 20 with a gap interposed therebetween; and a spacing member 24 that keeps a desired gap between the substrates and divides the gap between the display substrate 20 and the back substrate 22 into plural cells.

The above-described cells are regions surrounded by the display substrate 20, the back substrate 22, and the spacing member 24. In the cell, the color particle groups 34, the white particle group 36, and the dispersion medium 50 that disperses the respective particle groups are sealed. The color particle group 34 and the white particle group 36 are dispersed in the dispersion medium 50, and the color particle group 34 moves between the display substrate 20 and the back substrate 22 in response to an intensity of electric field formed in the cell.

This display medium 12 may be configured to realize color display for each pixel by providing the spacing member 24 so as to correspond to each pixel when an image is displayed; and forming the cell corresponding to each pixel.

In the dispersion medium 50 of the display medium 12, plural kinds of the color particle groups 34 having different colors from one another are dispersed. Plural kinds of the color particle groups 34 are the particles that electrophoretically move between the substrates. The absolute values of voltages of the respective color particle groups required for moving in response to an electric field are different from one another.

Display Substrate and Back Substrate

The display substrate 20 has a configuration in which, for example, a surface electrode 40 and a surface layer 42 are laminated in this order on a support substrate 38. The back substrate 22 has a configuration in which, for example, a back electrode 46 and a surface layer 48 are laminated in this order on a support substrate 44.

Examples of a material of the support substrate 38 and the support substrate 44 include glass and resins such as polycarbonate resin, acrylic resin, polyimide resin, polyester resin, epoxy resin, and polyether sulfone resin.

Examples of a material of the surface electrode 40 and the back electrode 46 include oxides of indium, tin, cadmium, antimony, and the like; complex oxides such as ITO; metals such as gold, silver, copper, and nickel; and organic materials such as polypyrrole and polythiophene. The surface electrode 40 and the back electrode 46 may be any one of a single film, a mixed film, and a composite film of the above-described materials and are formed using, for example, a vapor deposition method, a sputtering method, or a coating method.

The thicknesses of the surface electrode 40 and the back electrode 46 are adjusted so as to obtain a desired conductivity and are generally, for example, from 10 nm to 1 μm.

The back electrode 46 and the surface electrode 40 have a desired pattern formed thereon in, for example, a matrix shape or a stripe shape for realizing passive matrix driving using a well-known method of the related art such as etching of a liquid crystal display device or a printed wiring board.

The surface electrode 40 may be embedded info, for example, the support substrate 38. Likewise, the back electrode 46 may also be embedded into, for example, the support substrate 44. Each of the back electrode 46 and the surface electrode 40 may be arranged outside the display medium 12 separately from the display substrate 20 and the back substrate 22.

In the above description, either one or both of the display substrate 20 and the back substrate 22 include the electrodes (the surface electrode 40 and the back electrode 46).

In addition, in order to realize active matrix driving, the support substrate 38 and the support substrate 44 may include an active device such as a thin film transistor (TFT), a thin film diode (TFD), a metal-insulator-metal (MIM) device, or a varistor for each pixel. Since interconnection layering and component packaging are easy, it is preferable that the active device be formed on the back substrate 22 not on the display substrate 20.

When the surface electrode 40 and the back electrode 46 are formed on the support substrate 38 and the support substrate 44, respectively, leakage between the electrode, which causes damage to the surface electrode 40 and the back electrode 46 and causes the respective particles of the color particle groups 34 to be fixed, is suppressed. Therefore, optionally, it is preferable that the surface layer 42 and the surface layer 48 be formed on the surface electrode 40 and the back electrode 46 as dielectric films, respectively.

In the exemplary embodiment, the surface layers (the surface layer 42 and the surface layer 48) are formed on both opposing surfaces of the display substrate 20 and the back substrate 22, respectively, but may be formed on either one of the opposing surfaces of the display substrate 20 and the back substrate 22. In addition, the surface layers may be formed of different materials.

Examples of a material of the surface layer 42 and the surface layer 48 include polyolefins such as polyethylene or polypropylene, polycarbonate, polyester, polystyrene, polyimide, polyurethane, polyamide, polymethylmethacrylate, nylon copolymer, epoxy resin, ultraviolet ray-curable acrylic resin, silicone resin, and fluororesin.

When silicone oil is used as the dispersion medium 50, for example, the polymer compound having a silicone chain is preferable as the material of the surface layer 42 and the surface layer 48, from the viewpoint of preventing the particles from being fixed.

Examples of the polymer compound having a silicone chain include copolymers represented by the following structural units (A) and (B).

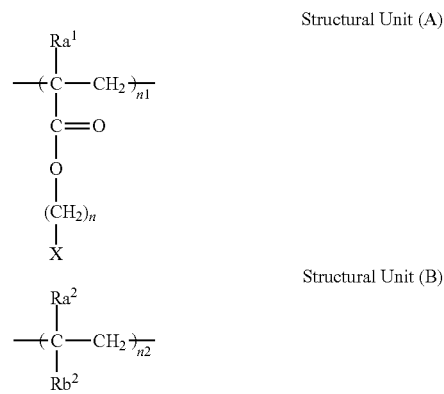

In the structural unit (A) and (B), X represents a group having a silicone chain.

$Ra^1$ represents a hydrogen atom or a methyl group.

$Ra^2$ represents a hydrogen atom, a methyl group, or a halogen atom (for example, a chlorine atom).

$Rb^2$ represents a hydrogen atom, an alkyl group, an alkenyl group, a cyan group, an aromatic group, a heterocyclic group, or —C(=O)—O-$Rc^2$ (wherein $Rc^2$ represents an alkyl group, a hydroxyalkyl group, a polyoxyalkyl group ((—$(C_xH_{2x}$—O)$_{n'}$—H (x and n' each independently represent an integer of 1 or more)), an amino group, a monoalkylamino group, or a dialkylamino group).

n1 and n2 represent the mole % of the structural units with respect to the entire copolymer, respectively in which 0<n1<50 and 0<n2<80. n represents a natural number of from 1 to 3.

In the structural unit (A), the group having a silicone chain represented by X is, for example, a group having a linear or branched silicone chain (a siloxane chain in which two or more Si—O bonds are linked), and is preferably a group having a dimethylsiloxane chain in which two or more dimethyl siloxane structures (—Si(CH$_3$)$_2$—O—) are linked and a portion (a portion of —CH$_3$) may be substituted with a substituent.

Specific examples of the group having a silicone chain represented by X include groups represented by the following structural formulae (X1) and (X2).

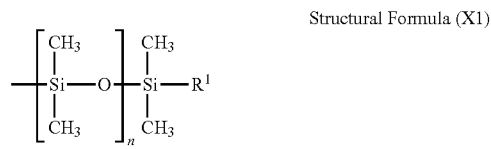

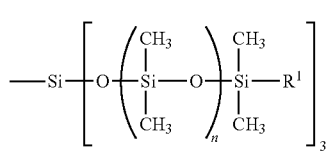

Structural Formula (X2)

In the structural formulae (X1) and (X2), $R^1$ represents a hydroxyl group, a hydrogen atom, or an alkyl group having from 1 to 10 carbon atoms, and n represents an integer of from 1 to 10.

In the polymer compound having a silicone chain, examples of the monomer forming the structural unit (A) include dimethyl silicone monomers having a (meth)acrylate group at a terminal (for example, SILAPLANE FM-0711, FM-0721, and FM-0725 manufactured by JNC Corporation, X-22-174DX, X-22-2426, and X-22-2475 manufactured by Shin-Etsu Chemical Co., Ltd.). Among these, SILAPLANE FM-0711, FM-0721, FM-0725, or the like is preferable.

Examples of the monomer forming the structural unit (B) include (meth)acrylonitrile, alkyl (meth)acrylate such as methyl methacrylate and butyl methacrylate, (meth)acrylamide, ethylene, propylene, butadiene, isoprene, isobutylene, N-dialkyl-substituted (meth)acrylamide, styrene, vinyl carbazole, styrene derivatives, polyethylene glycol mono(meth)acrylate, vinyl chloride, vinylidene chloride, isoprene, butadiene, vinylpyrrolidone, hydroxyethyl(meth)acrylate, and hydroxybutyl (meth)acrylate. In the above description, "(meth)acrylate" is the term including both "acrylate" and "methacrylate".

The polymer compound having a silicone chain may contain a crosslinking unit other than the structural units (A) and (B). Examples of the crosslinking unit include monomers having an epoxy group, an oxazoline group, or an isocyanate group.

The weight average molecular weight of the polymer compound having a silicone chain is preferably from 100 to 1,000,000 and more preferably 400 to 1,000,000. The weight average molecular weight is measured using a static light scattering method or a size-exclusion column chromatography, and numerical values described in this specification are measured using these methods.

The thicknesses of the surface layers (the surface layer 42, and the surface layer 48) which are formed of the polymer compound having a silicone chain are, for example, from 0.001 μm to 10 μm and preferably from 0.01 μm to 1 μm.

As the material of the surface layer 42 and the surface layer 48, in addition to the above-described insulating materials, a material obtained adding a charge transport material to the insulating material may be used. When the insulating material contains a charge transport material, there are effects in that particle charge properties are improved by electron injection to particles; and when a charge amount of particles is excessively great, the charge of the particles is leaked and thus the charge amount of the particles is stabilized.

Examples of the charge transport material include hole transport materials such as hydra zone compounds, stilbene compounds, pyrazoline compounds, and arylamine compounds; electron transport materials such as fluorenone compounds, diphenoquinone derivatives, pyran compounds, and zinc oxide; and charge-transporting resins such as polyvinyl carbazole.

Spacing Member

The spacing member 24 keeps the gap between the display substrate 20 and the back substrate 22 and is formed so as not to damage the transparency of the display substrate 20. For example, the spacing member 24 is formed of a thermoplastic resin, a thermosetting resin, an electron beam-curable resin, a photocurable resin, a rubber, or a metal.

The spacing member 24 may be cellular or granular. Examples of a cellular member include a net and a sheet in which holes are formed in a matrix shape by etching or laser processing.

The spacing member 24 may be integrated with either the display substrate 20 or the back substrate 22. The support substrate 38 or the support substrate 44 may be subjected to etching and laser processing, followed by pressing and printing using a die prepared in advance. As a result, The support substrate 38 or support substrate 44, which has a cellular pattern with a desired size, and the spacing member 24 are prepared. In this case, the spacing member 24 may be prepared on either one or both of the display substrate 20 side and the back substrate 22 side. The spacing member 24 may have a color, but is preferably colorless and transparent so as not to adversely affect an image displayed on the display medium 12.

Voltage Application Portion

The voltage application portion 16 is, for example, electrically connected to the surface electrode 40 and the back electrode 46. In the exemplary embodiment, both the surface electrode 40 and the back electrode 46 are electrically connected to the voltage application portion 16. However, one of the surface electrode 40 and the back electrode 46 may be grounded and the other may be connected to the voltage application portion 16.

The voltage application portion 16 is, for example, a voltage application device for applying a voltage to the surface electrode 40 and the back electrode 46 and applies a voltage between the surface electrode 40 and the back electrode 46 according to the control of the controller 18.

Controller

The controller 18 is connected to, for example, the voltage application portion 16 so as to receive and transmit signals therefrom and thereto.

Although not illustrated, the controller 18 is configured as a microcomputer including a central processing unit (CPU) that controls the overall operation of the entire device; a random access memory (RAM) that temporarily stores various kinds of data; and a read only memory (ROM) in which various programs including a control program for controlling the entire device and a processing routine program are stored in advance.

Driving Method

In the display device 10 according to the exemplary embodiment, an application voltage (V), which is applied between the display substrate 20 and the back substrate 22 in the display medium 12, is changed; and as a result, different colors are displayed.

In the display medium 12, the color particles move in response to an electric field formed between the display substrate 20 and the back substrate 22; as a result, a color corresponding to each pixel of image data is displayed on each cell corresponding to each pixel of the display medium 12.

As illustrated in FIG. 3, in the display medium 12, the absolute values of voltages of the respective color particle groups 34, which are required for electrophoretically moving between the substrates in response to an electric field, are different for each color. The color particles groups 34 of the respective colors have voltage ranges required for moving the color particles groups 34 of the respective colors. The voltage ranges are different from one another. In other words, the absolute values of voltages have the voltage ranges, and the voltage ranges are different for each color of the color particle groups 34.

Hereinafter, a method of driving the display device 10 (display medium 12) according to the exemplary embodiment (hereinafter, referred to as "driving method according to the exemplary embodiment") will be described. In the following description, the polarity of an application voltage represents the polarity of a voltage applied to the back electrode 46 of the back substrate 22.

In the driving method according to the exemplary embodiment, as illustrated in FIG. 2, two colors of the color particle groups 34 including the cyan particle group 34C of cyan and the red particle group 34R of red are sealed in the same cell of the display medium 12.

In this case, both the cyan particle group 34C and the red particle group 34R have the positive charge.

In the following description of the driving method according to the exemplary embodiment, it is assumed that two colors of the color particle groups including the cyan particle group 34C of cyan and the red particle group 34R of red have absolute values of voltages when starting moving (movement starting voltages), respectively; and the absolute value of the cyan particle group 34C of cyan is represented by |Vtc|, and the absolute value of the red particle group 34R of red is represented by |Vtr|.

In addition, in the following description, it is assumed that two colors of the color particle groups 34 including the cyan particle group 34C of cyan and the red particle group 34R of red have absolute values of maximum voltages for moving substantially all the particles, respectively; and the absolute value of the cyan particle group 34C of cyan is represented by |Vdc|, and the absolute value of the red particle group 34R of red is represented by |Vdr|.

In addition, in the following description, it is assumed that the absolute values of Vtr, −Vtr, Vdr, −Vdr, Vtc, −Vtc, Vdc and −Vdc satisfy the relationship of |Vtr|<|Vdr|<|Vtc|<|Vdc|.

Specifically, as illustrated in FIG. 3, for example, when all the color particle groups 34 have the same polarity, the absolute value |Vtr≤Vr≤Vdr| (the absolute value of a value between Vtr and Vdr) in the voltage range required for moving the red particle group 34R; and the absolute value |Vtc≤Vc≤Vdc| (the absolute value of a value between Vtc and Vdc) in the voltage range required for moving the cyan particle group 34C are set so as to be greater in this order without overlapping each other.

In addition, in order to drive the color particle groups 34 of the respective colors independently of each other, the absolute value |Vdr| of the maximum voltage for moving substantially all the particles of the red particle group 34R is set to be less than the absolute value |Vtc≤Vc≤Vdc| (the absolute value of a value between Vtc and Vdc) in the voltage range required for moving the cyan particle group 34C.

That is, in the driving method according to the exemplary embodiment, the voltage ranges required for moving the color particle groups 34 of the respective colors are set so as not to overlap each other. As a result, the color particle groups 34 of the respective colors are driven independently of each other.

"The voltage range required for moving the color particle groups 34" refers to the voltage range from the voltage required for starting moving the particles to the voltage at which the display density are not changed and are saturated even when the voltage and the voltage application time are further increased after starting the movement.

In addition, "the maximum voltages required for moving substantially all the particles of the color particle group 34" refers to the voltage at which the display density are not changed and are saturated even when the voltage and the voltage application time are further increased after starting the movement.

In addition, "substantially all" refers to the degree to which the properties of a part of the color particle groups 34 do not contribute to the display properties because there are variations in the properties of the color particle groups 34 of the respective colors. That is, "substantially all" refers to the state in which the display density is not changed and are saturated even when the voltage and the voltage application time are further increased after starting the movement.

In addition, "the display density" refers to the density obtained using the following method: a voltage is applied between the display surface and the back surface while measuring the color density on the display surface using a reflection densitometer (manufactured by X-rite Inc.) of optical density (OD); this voltage is gradually changed (application voltage is increased or reduced) in a direction in which the measured density is increased to make changes in density per unit voltage saturated; and in this state, a density which is not changed and is saturated even when the voltage and the voltage application time are increased is obtained as the display density.

In the driving method according to the exemplary embodiment, the voltage is applied between the display substrate 20 and the back substrate 22 from 0V, and the application voltage is gradually increased. When the voltage applied between the substrates exceeds +Vtr, the display density starts being changed by the movement of the red particle group 34R in the display medium 12. When the voltage value is further increased and the voltage applied between the substrates reaches +Vdr, changes in the display density caused by the movement of the red particle group 34R in the display medium 12 stop.

When the voltage value is further increased and the voltage applied between the display substrate 20 and the back substrate 22 exceeds +Vtc, the display density starts being changed by the movement of the cyan particle group 34C in the display medium 12. When the voltage value is further increased and the voltage applied between the display substrate 20 and the back substrate 22 reaches +Vdc, changes in the display density caused by the movement of the cyan particle group 34C in the display medium 12 stop.

Conversely, the negative voltage is applied between the display substrate 20 and the back substrate 22 from 0V such that the absolute value of the voltage is gradually increased. When the absolute value of the voltage applied between the substrates exceeds the absolute value of −Vtr, the display density starts being changed by the movement of the red particle group 34R between the substrates in the display medium 12. When the absolute value of the voltage value is further increased and the voltage applied between the display substrate 20 and the back substrate 22 is lower than or equal to −Vdr, changes in the display density caused by the movement of the red particle group 34R in the display medium 12 stop.

When the absolute value of the voltage value is further increased, the negative voltage is applied, and the absolute value of the voltage applied between the display substrate 20 and the back substrate 22 exceeds the absolute value of −Vtc, the display density starts being changed by the movement of the cyan particle group 34C in the display medium 12. When the absolute value of the voltage value is further increased and the voltage applied between the display substrate 20 and the back substrate 22 reaches −Vdc, changes in the display density caused by the movement of the cyan particle group 34C in the display medium 12 stop.

That is, in the driving method according to the exemplary embodiment, as illustrated in FIG. 3, when the voltage is applied between the display surface 20 and the back surface 22 within the range from −Vtr to Vtr (less than or equal to the voltage range |Vtr|), the color particle groups 34 (the red particle group 34R and the cyan particle group 34C) do not move to a degree to which the display density of the display medium 12 is changed.

When the voltage having an absolute value, which is greater than or equal to that of the voltage +Vtr and the voltage −Vtr, is applied between the substrates, particles of the red particle group 34R among two colors of the color particle groups 34 start moving to a degree to which the display density of the display medium 12 is changed. When the display density starts being changed and the voltage having an absolute value, which is greater than or equal to the absolute value |Vdr| of the voltage −Vdr and the voltage Vdr, is applied between the substrates, changes in display density per unit voltage stop.

Furthermore, when the voltage is applied between the display substrate 20 and the back substrate 22 within the range from −Vtc to Vtc (less than or equal to the voltage range |Vtc|), particles of the cyan particle group 34C do not move to a degree to which the display density of the display medium 12 is changed.

When the voltage having an absolute value, which is greater than or equal to that of the voltage +Vtc and the voltage −Vtc, is applied between the substrates, particles of the cyan particle group 34C start moving to a degree to which the display density of the display medium 12 is changed. When the display density per unit voltage starts being changed and the voltage having an absolute value, which is greater than or equal to the absolute value |Vdc| of the voltage −Vdc and the voltage Vdc, is applied between the substrates, changes in display density stop.

Next, the driving method according to the exemplary embodiment will be described in detail referring to FIG. 4

First, the voltage −Vdc is applied between the display substrate 20 and the back substrate 22. As a result, all the cyan particle group 34C and the red particle group 34R are positioned on the back substrate 22 side, thereby obtaining white (W) display (refer to FIG. 4A).

Next, when the voltage +Vdc is applied in the state of FIG. 4A, all the cyan particle group 34C and the red particle group 34R move to the display substrate 20 side, thereby obtaining black (K) display (refer to FIG. 4B).

Next, when the voltage +Vtc is applied in the state of FIG. 4A, the red particle group 34R move to the display substrate 20 side and the cyan particle group 34C maintains the state, thereby obtaining red (R) display (refer to FIG. 4C).

When the voltage is higher than +Vtc and less than +Vdc, a part of the cyan particle group 34C move, thereby obtaining halftone display.

Next, when the voltage −Vdc is applied in the state of FIG. 4B, all the cyan particle group 34C and the red particle group 34R move to the back substrate 22 side, thereby obtaining white (W) display (refer to FIG. 4D).

When the voltage −Vdr is applied in the state of FIG. 4B, the cyan particle group 34C remains on the display substrate 20 side and the red particle group 34R move to the back substrate 22 side, thereby obtaining cyan (C) display (refer to FIG. 4E).

On the other hand, when the voltage −Vdr is applied in the state of FIG. 4C, the cyan particle group 34C remains on the back substrate 22 side and the red particle group 34R move to the back substrate 22 side, thereby obtaining white (W) display (refer to FIG. 4F).

When the voltage is lower than −Vtr and higher than −Vdr, a part of the red particle group 34R move, thereby obtaining halftone display.

As described above, in the driving method according to the exemplary embodiment, the voltages corresponding to the respective color particle groups 34 are sequentially applied between the substrates according to the order of high movement starting voltage, the respective particles selectively move, thereby realizing the desired color display.

Electronic Devices Including Display Device

The display device according to the exemplary embodiment may be included in an electronic device, a display medium, a card medium, or the like (specifically, for example, an electronic bulletin board, electronic notice board, electronic blackboard, electronic advertisement, electronic signboard, blinking signal, electronic paper, electronic newspaper, electronic book, electronic document, sheet used for a copying machine or a printer, portable computer, tablet computer, mobile phone, smart cart, signing machine, timepiece, shelf label or flash drive).

EXAMPLES

Hereinafter, the exemplary embodiments will be described in more detail using examples. However, the exemplary embodiments are not limited to these examples.

Preparation of Cyan Particles
Preparation of Cyan Particles C1
1) Preparation of Core Particles (Liquid Drying Method)

6.48 g of styrene acrylic resin "X345 (manufactured by Seiko PMC Corporation) as the water-soluble resin; 0.72 g (equivalent to 10% by weight with respect to all the resins) of melamine resin "MX035 (manufactured by Sanwa Chemical Co., Ltd.); 18.8 g of water dispersion "Emacol SFBlue H524F (manufactured by Sanyo Color Work Ltd.)" containing 26% by weight of cyan pigment "PB15:3"; and 24.1 g of distilled water are mixed with each other while heating them at 60° C. A dispersed phase having an solid content concentration of ink of 15% and a dried pigment concentration of 50% is prepared.

Next, 3.5 g of surfactant "KF-6028 (manufactured by Shin-Etsu Chemical Co., Ltd.) is dissolved in silicone oil "KF-96L-2CS (manufactured by Shin-Etsu Chemical Co., Ltd.) to prepare 350 g of continuous phase. Then, 50 g of the dispersed phase is added to the continuous phase, followed by emulsification with a internal tooth type tabletop disperser ROBOMICS (manufactured by Tokushu Kika Kogyo Co., Ltd.) at a rotating speed of 8,000 rpm at a temperature of 30° C. for 10 minutes.

As a result, an emulsion having a droplet diameter of about 2 μm is obtained. This emulsion is dried using a rotary evaporator at a vacuum degree of 20 mbar at a water bath temperature of 50° C. for 12 hours.

Furthermore, a precipitation process of this silicone oil particle dispersion using a centrifugal separator and a redispersion process using a ultrasonic washing machine are repeatedly performed three times. The resultant is concentrated by removing an excess amount of surfactant "KF-6028 (manufactured by Shin-Etsu Chemical Co., Ltd.) therefrom. As a result, 6 g of core particles is obtained. Conditions of centrifugal separation are 6000 rpm and 15 minutes. When the core particles are observed by an SEM and an image is analyzed, the average particle diameter is 0.6 μm and the C.V.

value (monodisperse index; Coefficient of Variation (CV; %)=(σ/D)×100 (σ: standard deviation, D: average particle diameter) is 30%.

2) Surface Treatment 83 g of silicone macromonomer "SILAPLANE FM-0721 (manufactured by JNC Corporation)"; 2.3 g of monomer having a phenoxy group "AMP-10G (manufactured by Shin-Nakamura Chemical Co., Ltd.)"; and 4.4 g of monomer having a blocked isocyanate group "KARENZ MOI-BP (manufactured by Showa Denko K.K.)" are mixed and dissolved in 210 g of silicone oil "KF-96L-2CS (manufactured by Shin-Etsu Chemical Co., Ltd.)". 0.9 g of polymerization initiator AIBN (2,2'-azobis (isobutyronitrile)) is dissolved therein, followed by polymerization under nitrogen flow at 60° C. for 6 hours. As a result, a resin for surface treatment is prepared and a surface treatment solution is obtained.

Next, 1 g of the core particles is put into a 200 mL eggplant flask and 29 g of "silicone oil "KF-96L-2CS (manufactured by Shin-Etsu Chemical Co., Ltd.)" is added thereto. The core particle dispersion is stirred and dispersed at 25° C. while applying ultrasonic waves thereto. 6 g of the surface treatment solution is poured thereto. The pouring speed of the surface treatment solution is 0.5 mL/s.

Next, the resultant is heated in an oil bath under stirring. First, heating is performed at 100° C. for 0.5 hour and is further performed at 130° C. for 1 hour to liberate a blocking group from the blocked isocyanate group, thereby causing the resin for surface treatment and the melamine resin in the core particles to react with each other.

Next, after cooling, the precipitation process of the silicone oil particle dispersion using a centrifugal separator and the redispersion process using a ultrasonic washing machine are repeatedly performed three times to remove an excess amount of the resin for surface treatment. Finally, 0.7 g of particles is obtained.

Through the above-described processes, cyan particles C1 are obtained. The obtained cyan particles C1 have the positive charge.

Preparation of Cyan Particles C2

Cyan particles C2 are obtained (finally, 0.6 g of particles is obtained) with the same preparation method as that of the cyan particles C1, except that, in the preparation of the core particles, the mixing amount of styrene acrylic resin "X345 (manufactured by Seiko PMC Corporation)" is changed to 6.84 g; and the mixing amount of melamine resin "MX035 (manufactured by Sanwa Chemical Co., Ltd.)" is changed to 0.36 g (equivalent to 5% by weight with respect to the all the resins). The obtained cyan particles C2 have the positive charge.

Preparation of Cyan Particles C3

A surface treatment solution is obtained with the same preparation method as that of the surface treatment solution prepared in the cyan particles C1, except that the monomer having a phenoxy group "AMP-10G (manufactured by Shin-Nakamura Chemical Co., Ltd.)" is not added.

Cyan particles C3 are obtained (finally, 0.56 g of particles is obtained) with the same preparation method as that of the cyan particles C1, except that the prepared surface treatment solution and the core particles prepared in the cyan particles C2 are used. The obtained cyan particles C3 have the positive charge.

Preparation of Cyan Particles C4

A surface treatment solution is obtained with the same preparation method as that of the surface treatment solution prepared in the cyan particles C1, except that the mixing amount of the monomer having a phenoxy group "AMP-10G (manufactured by Shin-Nakamura Chemical Co., Ltd.)" is changed to 4.6 g.

Cyan particles C4 are obtained (finally, 0.8 g of particles is obtained) with the same preparation method as that of the cyan particles C1, except that the prepared surface treatment solution and the core particles prepared in the cyan particles C2 are used. The obtained cyan particles C4 have the positive charge.

Preparation of Red Particles

Preparation of Red Particles R1

Preparation of Dispersion A-1A

The following components are mixed, followed by pulverization with 10 mmϕ zirconia ball mill for 20 hours to prepare a dispersion A-1A.

Methyl methacrylate: 38.7 g
2-(diethylamino)ethyl methacrylate: 2.25 g
Red pigment (RED3090, manufactured by Sanyo Color Work Ltd.): 4.05 g Preparation of Dispersion A-1B (Calcium Carbonate Dispersion A-1B)

The following components are mixed, followed by pulverization with the same ball mill to prepare a calcium carbonate dispersion A-1B.

Calcium carbonate: 40 g
Water: 60 g

Preparation of Mixed Solution A-1C

The following components are mixed, followed by deaeration with ultrasonic device for 10 minutes and stirring with an emulsifying device to prepare a mixed solution A-1C.

Calcium Carbonate dispersion A-1B: 60 g
20% saline solution: 4 g

Preparation of Color Particles 20 g of Dispersion A-1A, 0.6 g of ethylene glycol dimethacrylate, 0.2 g of polymerization initiator V601 (Dimethyl 2,2'-azobis(2-methylpropionate), manufactured by Wako Pure Chemical Industries Ltd.) are weighed and prepared and are sufficiently mixed, followed by deaeration with a ultrasonic device for 10 minutes. The mixed solution A-1C is added thereto, followed by emulsification with an emulsifying device.

Next, this emulsion is put into a flask and sealed with a silicone cork, followed by evacuation using an injection needle. Nitrogen gas is introduced thereinto. Next, the reaction is caused at 65° C. for 15 hours to prepare particles.

After cooling, the particles are separated by filtration. The obtained particles are dispersed in ion exchange water to decompose calcium carbonate with aqueous hydrochloric acid solution, followed by filtration.

Then, the resultant is sufficiently washed with distilled water and sieved through a nylon sieve having a pore size of 13 μm and 5 μm to make particle diameters uniform. When the particles are measured by a microscope and an image is analyzed, the volume average particle diameter is 10 μm and the C.V. value is 15%.

Treatment of Obtaining Quaternary Ammonium Salt

The obtained particles are dispersed in 1 cSt silicone oil (KF-96L-1CS, manufactured by Shin-Etsu Chemical Co., Ltd.). The same molar quantity of dodecyl bromide (quaternizing agent) as that of 2-(diethylamino)ethyl methacrylate used in the preparation of the particles is added thereto, followed by heating at 90° C. for 6 hours.

After cooling, this dispersion is washed with a large amount of silicone oil, followed by drying under reduced pressure. As a result, red particles R1 is obtained. The obtained red particles R1 have the positive charge.

Preparation of Red Particles R2

Red particles R2 are obtained with the same preparation method as that of the red particles R1, except, that, in the preparation of the dispersion A-1A, the mixing amount of 2-(diethylamino)ethyl methacrylate is changed to 4.5 g. The obtained red particles R2 have the positive charge.

Preparation of Red Particles R3

Red particles R3 are obtained with the same preparation method as that of the red particles R1, except that, in the preparation of the dispersion A-1A, the mixing amount of 2-(diethylamino)ethyl methacrylate is changed to 1.5 g. The obtained red particles R3 have the positive charge.

Preparation of White Particles

Preparation of White Particles W 45 g of 2-vinylnaphthalene (manufactured by Nippon Steel & Sumikin Chemical Co., Ltd), 45 g of silicone macromonomer "SILAPLANE FM-0721 (manufactured by JNC Corporation)", and 240 g of silicone oil "KF-96L-1CS (manufactured by Shin-Etsu Chemical Co., Ltd.)" are put into a 500 ml three-necked flask with a reflux cooling tube attached. The resultant is heated at 65° C., followed by bubbling with nitrogen gas for 15 minutes, and 2.3 g of initiator lauroyl peroxide (Sigma-Aldrich Co. Llc.) is put thereinto. Polymerization is performed in a nitrogen atmosphere at 65° C. for 24 hours.

A washing process of separating the obtained particle suspension using a centrifugal separator at 8,000 rpm for 10 minutes to remove supernatant liquid therefrom and performing redispersion using silicone oil "KF-96L-2CS (manufactured by Shin-Etsu Chemical Co., Ltd.)" is repeatedly performed three times. Finally, a white particle W dispersion in which the particle solid content concentration is 40% by weight in silicone oil is obtained. The volume average particle diameter of the white particles W is 450 nm.

Examples (CRW Mixed System, CR: the Same Polarity)

0.01 g of the cyan particles C1, 1.0 g of the red particles R1, and 2.5 g of the white particles W are added to the silicone oil "KF-96L-2CS (manufactured by Shin-Etsu Chemical Co., Ltd.)" such that the total amount is 10.0 g, followed by stirring with ultrasonic waves. As a result, a CRW-based display particle dispersion (1) is prepared.

CRW-based display particle dispersions (2) to (48) are prepared with the same preparation method as that of the CRW-based display particle dispersion (1), except that the kind and concentration of the cyan particles and the kind and concentration of the red particles are changed according to the Tables 1 and 2.

Evaluation

Properties of Respective Particles

Regarding the color particles included in the display particle dispersion prepared in each example according to the above-described method, the charge amount per unit area of display and the volume average particle diameter are measured. The results thereof are shown in Tables 1 and 2.

Display Driving Properties

Synthesis of Polymer Compound A 5 parts by weight of "SILAPLANE FM-0721 (manufactured by JNC Corporation, weight average molecular weight=5000)", 5 parts by weight of phenoxyethylene glycol acrylate (NK ESTER AMP-10G, manufactured by Shin-Nakamura Chemical Co., Ltd.), and 90 parts by weight of hydroxyethyl methacrylate (manufactured by Wako Pure Chemical Industries Ltd.) are mixed with 300 parts by weight of isopropyl alcohol (IPA)-1 part by weight of polymerization initiator AIBN (2,2-azobisisobutyronitrile) is dissolved therein, followed by polymerization in a nitrogen atmosphere at 70° C. for 6 hours. The obtained product is purified with hexane as a reprecipitation solvent, followed by drying to prepare a polymer compound A.

Preparation of Evaluation Cell

The polymer compound A is dissolved in IPA (isopropyl alcohol) so as to have a solid content concentration of 4% by weight. The polymer compound A solution is spin-coated on a glass substrate on which an indium tin oxide (ITO) layer having a thickness of 50 nm is formed as an electrode by the sputtering method, followed by drying at 130° C. for 1 hour. As a result, a surface layer having a thickness of 100 nm is formed.

Two surface layer-formed ITO substrates prepared as described above are prepared as a display substrate and a back substrate. Using a 50 μm TEFLON (registered trademark) sheet as a spacer, the display substrate is disposed on the back substrate such that the surface layers face each other. The substrates are fixed by a clip.

The display particle dispersion prepared in each example is put into a gap between the substrates and sealed to prepare an evaluation cell.

Evaluation for Maintainability of Mixed Color Display

Using the prepared evaluation cell, a potential difference of 15 V is applied between the pair of electrodes for 5 seconds such that the electrode on the display substrate is positive. The cyan particles having the positive charge and the red particles having the positive charge move to the negative electrode side, that is, move to the back electrode side. In this state, when the evaluation cell is observed from the display substrate side, white display is observed due to the white particles.

Next, a potential difference of 15 V is applied between the pair of electrodes for 5 seconds such that the electrode on the display substrate is negative. The cyan particles having the positive charge and the red particles having the positive charge move to the negative electrode side, that is, move to the display electrode side. In this state, when the evaluation cell is observed from the display substrate side, black display which is the mixed color of cyan and red is observed due to the cyan particles and the red particles.

Immediately after driving, the number of the red particles attached onto the display substrate is obtained by observation in an enlarging manner using a microscope (VHX-600, manufactured by Keyence Corporation).

Next, in a state where the electrode on the display substrate side and the electrode on the back substrate side are short-circuited, the evaluation cell is left to stand for 30 minutes such that the display substrate side faces upward. Then, the number of the red particles attached onto the display substrate is obtained by observation in an enlarging manner using a microscope When the number of the red particles attached onto the display substrate immediately after driving is represented by Nf; and the number of the red particles attached onto the display substrate after the evaluation cell is left to stand for 30 minutes in the short-circuited state is represented by Na, the ratio (Na/Nf) is obtained as the retention ratio of the red particles. The maintainability of mixed color display is evaluated based on the retention ratio of the red particles. The results are shown in Tables 1 and 2.

Since the red particles which are the large-diameter color particles having a greater weight move away from the display substrate ahead, the retention ratio of the cyan particles are not obtained.

Hereinafter, the details of each example and the evaluation results are shown in Tables 1 and 2. The abbreviations shown in Tables 1 and 2 are as follows.

Red: Red particles
Cyan: Cyan particles
D50: Volume average particle Diameter
Charge: Charge amount of each particles per unit, area of display
Charge Ratio: Cs/Cl ratio

TABLE 1

| Display Particle Dispersion No. | Color Particles No. Red | Color Particles No. Cyan | D50 (μm) Red | D50 (μm) Cyan | Concentration (% By Weight) Red | Concentration (% By Weight) Cyan | Charge (nC/cm²) Red (Cl) | Charge (nC/cm²) Cyan (Cs) | Charge Ratio Cyan (Cs)/Red (Cl) | Evaluation Maintainability of Mixed Color Display (Retention Ratio %) | Note |
|---|---|---|---|---|---|---|---|---|---|---|---|
| (1) | R1 | C1 | 10 | 0.6 | 10 | 0.8 | 1 | 0.8 | 0.8 | 100 | Ex. |
| (2) | R1 | C1 | 10 | 0.6 | 10 | 1 | 1 | 1 | 1 | 100 | Ex. |
| (3) | R1 | C1 | 10 | 0.6 | 10 | 1.2 | 1 | 1.2 | 1.2 | 95 | Ex. |
| (4) | R1 | C1 | 10 | 0.6 | 10 | 1.5 | 1 | 1.5 | 1.5 | 90 | Ex. |
| (5) | R1 | C2 | 10 | 0.6 | 10 | 0.8 | 1 | 1.2 | 1.2 | 99 | Ex. |
| (6) | R1 | C2 | 10 | 0.6 | 10 | 1 | 1 | 1.5 | 1.5 | 92 | Ex. |
| (7) | R1 | C2 | 10 | 0.6 | 10 | 1.2 | 1 | 1.8 | 1.8 | 90 | Ex. |
| (8) | R1 | C2 | 10 | 0.6 | 10 | 1.5 | 1 | 2.25 | 2.25 | 82 | Ex. |
| (9) | R1 | C3 | 10 | 0.6 | 10 | 0.8 | 1 | 2 | 2 | 95 | Ex. |
| (10) | R1 | C3 | 10 | 0.6 | 10 | 1 | 1 | 2.5 | 2.5 | 85 | Ex. |
| (11) | R1 | C3 | 10 | 0.6 | 10 | 1.2 | 1 | 3 | 3 | 70 | Ex. |
| (12) | R1 | C3 | 10 | 0.6 | 10 | 1.5 | 1 | 3.75 | 3.75 | 55 | Ex. |
| (13) | R1 | C4 | 10 | 0.6 | 10 | 0.8 | 1 | 4 | 4 | 75 | Ex. |
| (14) | R1 | C4 | 10 | 0.6 | 10 | 1 | 1 | 5 | 5 | 50 | Ex. |
| (15) | R1 | C4 | 10 | 0.6 | 10 | 1.2 | 1 | 6 | 6 | 10 | Comp. Ex. |
| (16) | R1 | C4 | 10 | 0.6 | 10 | 1.5 | 1 | 7.5 | 7.5 | 5 | Comp. Ex. |
| (17) | R2 | C1 | 10 | 0.6 | 10 | 0.8 | 3 | 0.8 | 0.27 | 100 | Ex. |
| (18) | R2 | C1 | 10 | 0.6 | 10 | 1 | 3 | 1 | 0.33 | 100 | Ex. |
| (19) | R2 | C1 | 10 | 0.6 | 10 | 1.2 | 3 | 1.2 | 0.4 | 99 | Ex. |
| (20) | R2 | C1 | 10 | 0.6 | 10 | 1.5 | 3 | 1.5 | 0.5 | 92 | Ex. |
| (21) | R2 | C2 | 10 | 0.6 | 10 | 0.8 | 3 | 1.2 | 0.4 | 100 | Ex. |
| (22) | R2 | C2 | 10 | 0.6 | 10 | 1 | 3 | 1.5 | 0.5 | 100 | Ex. |
| (23) | R2 | C2 | 10 | 0.6 | 10 | 1.2 | 3 | 1.8 | 0.6 | 98 | Ex. |
| (24) | R2 | C2 | 10 | 0.6 | 10 | 1.5 | 3 | 2.25 | 0.75 | 92 | Ex. |
| (25) | R2 | C3 | 10 | 0.6 | 10 | 0.8 | 3 | 2 | 0.67 | 100 | Ex. |
| (26) | R2 | C3 | 10 | 0.6 | 10 | 1 | 3 | 2.5 | 0.83 | 100 | Ex. |
| (27) | R2 | C3 | 10 | 0.6 | 10 | 1.2 | 3 | 3 | 1 | 98 | Ex. |
| (28) | R2 | C3 | 10 | 0.6 | 10 | 1.5 | 3 | 3.75 | 1.25 | 90 | Ex. |
| (29) | R2 | C4 | 10 | 0.6 | 10 | 0.8 | 3 | 4 | 1.33 | 100 | Ex. |
| (30) | R2 | C4 | 10 | 0.6 | 10 | 1 | 3 | 5 | 1.67 | 98 | Ex. |
| (31) | R2 | C4 | 10 | 0.6 | 10 | 1.2 | 3 | 6 | 2 | 92 | Ex. |
| (32) | R2 | C4 | 10 | 0.6 | 10 | 1.5 | 3 | 7.5 | 2.5 | 80 | Ex. |

TABLE 2

| Display Particle Dispersion No. | Color Particles No. Red | Color Particles No. Cyan | D50 (μm) Red | D50 (μm) Cyan | Concentration (% By Weight) Red | Concentration (% By Weight) Cyan | Charge (nC/cm²) Red (Cl) | Charge (nC/cm²) Cyan (Cs) | Charge Ratio Cyan (Cs)/Red (Cl) | Evaluation Maintainability of Mixed Color Display (Retention Ratio %) | Note |
|---|---|---|---|---|---|---|---|---|---|---|---|
| (33) | R3 | C1 | 10 | 0.6 | 10 | 0.8 | 0.7 | 0.8 | 1.14 | 99 | Ex. |
| (34) | R3 | C1 | 10 | 0.6 | 10 | 1 | 0.7 | 1 | 1.43 | 95 | Ex. |
| (35) | R3 | C1 | 10 | 0.6 | 10 | 1.2 | 0.7 | 1.2 | 1.71 | 92 | Ex. |
| (36) | R3 | C1 | 10 | 0.6 | 10 | 1.5 | 0.7 | 1.5 | 2.14 | 82 | Ex. |
| (37) | R3 | C2 | 10 | 0.6 | 10 | 0.8 | 0.7 | 1.2 | 1.71 | 95 | Ex. |
| (38) | R3 | C2 | 10 | 0.6 | 10 | 1 | 0.7 | 1.5 | 2.14 | 88 | Ex. |
| (39) | R3 | C2 | 10 | 0.6 | 10 | 1.2 | 0.7 | 1.8 | 2.57 | 75 | Ex. |
| (40) | R3 | C2 | 10 | 0.6 | 10 | 1.5 | 0.7 | 2.25 | 3.21 | 60 | Ex. |
| (41) | R3 | C3 | 10 | 0.6 | 10 | 0.8 | 0.7 | 2 | 2.86 | 88 | Ex. |
| (42) | R3 | C3 | 10 | 0.6 | 10 | 1 | 0.7 | 2.5 | 3.57 | 75 | Ex. |
| (43) | R3 | C3 | 10 | 0.6 | 10 | 1.2 | 0.7 | 3 | 4.29 | 55 | Ex. |
| (44) | R3 | C3 | 10 | 0.6 | 10 | 1.5 | 0.7 | 3.75 | 5.36 | 10 | Comp. Ex. |
| (45) | R3 | C4 | 10 | 0.6 | 10 | 0.8 | 0.7 | 4 | 5.71 | 48 | Comp. Ex. |
| (46) | R3 | C4 | 10 | 0.6 | 10 | 1 | 0.7 | 5 | 7.14 | 25 | Comp. Ex. |

TABLE 2-continued

| Display Particle Dispersion No. | No. Red | No. Cyan | D50 (μm) Red | D50 (μm) Cyan | Concentration (% By Weight) Red | Concentration (% By Weight) Cyan | Color Particles Charge (nC/cm$^2$) Red (Cl) | Charge (nC/cm$^2$) Cyan (Cs) | Charge Ratio Cyan (Cs)/Red (Cl) | Evaluation Maintainability of Mixed Color Display (Retention Ratio %) | Note |
|---|---|---|---|---|---|---|---|---|---|---|---|
| (47) | R3 | C4 | 10 | 0.6 | 10 | 1.2 | 0.7 | 6 | 8.57 | 5 | Comp. Ex. |
| (48) | R3 | C4 | 10 | 0.6 | 10 | 1.5 | 0.7 | 7.5 | 10.7 | 0 | Comp. Ex. |

It is found from the above results that the display particle dispersions according to Examples have a higher retention ratio of the red particles and higher maintainability of mixed color display compared to the display particle dispersions according to Comparative Examples.

In addition, it is found that the display particle dispersions according to Examples having a Cs/Cl ratio of 2 or less have a higher retention ratio of the red particles and higher maintainability of mixed color display compared to the display particle dispersions having a Cs/Cl ratio of greater than 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A particle dispersion for display comprising:
   color particles for display that move in response to an electric field and include first color particles and second color particles; and
   a dispersion medium that disperses the color particles for display,
   wherein the second color particles have a larger particle diameter than a particle diameter of the first color particles,
   wherein in the color particles for display, a ratio (Cs/Cl) of a charge amount Cs of the first color particles per unit area of display to a charge amount Cl of the second color particles per unit area of display is less than or equal to 5, and
   wherein the first color particles and the second color particles are positively charged, or the first color particles and the second color particles are negatively charged.

2. The particle dispersion for display according to claim 1, wherein the ratio (Cs/Cl) of the charge amount Cs of the first color particles per unit area of display to the charge amount Cl of the second color particles per unit area of display is less than or equal to 2.

3. The particle dispersion for display according to claim 1, wherein the charge amount Cs of the first color particles per unit area of display is from 0.5 nC/cm$^2$ to 5 nC/cm$^2$.

4. The particle dispersion for display according to claim 2, wherein the charge amount Cs of the first color particles per unit area of display is from 0.5 nC/cm$^2$ to 5 nC/cm$^2$.

5. The particle dispersion for display according to claim 1, wherein the charge amount Cl of the second color particles per unit area of display is from 0.5 nC/cm$^2$ to 3 nC/cm$^2$.

6. The particle dispersion for display according to claim 2, wherein the charge amount Cl of the second color particles per unit area of display is from 0.5 nC/cm$^2$ to 3 nC/cm$^2$.

7. The particle dispersion for display according to claim 3, wherein the charge amount Cl of the second color particles per unit area of display is from 0.5 nC/cm$^2$ to 3 nC/cm$^2$.

8. The particle dispersion for display according to claim 4, wherein the charge amount Cl of the second color particles per unit area of display is from 0.5 nC/cm$^2$ to 3 nC/cm$^2$.

9. The particle dispersion for display according to claim 1, wherein a volume average particle diameter of the first color particles is from 0.3 μm to 0.9 μm.

10. The particle dispersion for display according to claim 1, wherein a volume average particle diameter of the second color particles is from 5 μm to 20 μm.

11. The particle dispersion for display according to claim 1, wherein a concentration of the first color particles and the second color particles in the particle dispersion for display is from 0.01% by weight to 50% by weight.

12. The particle dispersion for display according to claim 1, further comprising:
    third color particles that are positively charged and the first color particles and the second color particles are positively charged, or the third color particles are negatively charged and the first color particles and the second color particles are negatively charged, or the third color particles are positively charged and the first color particles and the second color particles are negatively charged, or the third color particles are negatively charged and the first color particles and the second color particles are positively charged.

13. The particle dispersion for display according to claim 12,
    wherein the third color particles and the first color particles and the second color particles are positively charged, or the third color particles and the first color particles and the second color particles are negatively charged and
    a ratio of a charge amount of particles having a smaller volume average particle diameter per unit area of display to a charge amount of particles having a larger volume average particle diameter per unit area of display is less than or equal to 5 between a charge amount Ct of the third color particles per unit area of display and the charge amount Cs of the first color particles per unit area of display or the charge amount Cl of the second color particles per unit area of display.

14. The particle dispersion for display according to claim 12, wherein a volume average particle diameter of the third color particles is from 0.05 μm to 20 μm.

15. The particle dispersion for display according to claim 1, further comprising:
white particles for display that do not move in response to an electric field or move at a slower response time to an electric field than a response time of color particles.

16. The particle dispersion for display according to claim 15, wherein a concentration of the white particles for display in the particle dispersion for display is from 1% by volume to 50% by volume.

17. A display medium comprising:
a pair of substrates at least one of which is translucent or a pair of electrodes at least one of which is translucent; and
the particle dispersion for display according to claim 1 that is sealed between the pair of substrates or a region that is provided between the pair of electrodes and contains the particle dispersion for display according to claim 1.

18. A display device comprising:
the display medium according to claim 17; and
a voltage application unit that applies a voltage between the pair of substrates or the pair of electrodes of the display medium.

* * * * *